United States Patent [19]
Matsushita et al.

[11] Patent Number: 4,837,556
[45] Date of Patent: Jun. 6, 1989

[54] SIGNAL TRANSMISSION DEVICE

[75] Inventors: Akira Matsushita; Shohkichi Nakano, both of Kawasaki, Japan

[73] Assignee: Kabushiki Kaisha Nihon Denzai Kogyo Kenkyusho, Kawasaki, Japan

[21] Appl. No.: 239,043

[22] Filed: Aug. 30, 1988

Related U.S. Application Data

[63] Continuation of Ser. No. 852,009, Apr. 14, 1986, abandoned.

[30] Foreign Application Priority Data

| Apr. 15, 1985 | [JP] | Japan | 60-79762 |
| May 27, 1985 | [JP] | Japan | 60-113899 |
| May 27, 1985 | [JP] | Japan | 60-113900 |
| May 27, 1985 | [JP] | Japan | 60-113901 |
| Jun. 11, 1985 | [JP] | Japan | 60-126701 |
| Jun. 11, 1985 | [JP] | Japan | 60-126702 |
| Aug. 9, 1985 | [JP] | Japan | 60-175342 |
| Sep. 9, 1985 | [JP] | Japan | 60-199124 |
| Dec. 5, 1985 | [JP] | Japan | 60-273645 |

[51] Int. Cl.$^4$ .................. H04M 11/04; G02F 1/00
[52] U.S. Cl. .................. 340/310 R; 340/531; 455/603; 455/605; 455/606
[58] Field of Search .......... 340/310 R, 310 A, 539, 340/531; 455/52, 69, 127, 600–603, 605, 606

[56] References Cited

U.S. PATENT DOCUMENTS

| 3,732,496 | 5/1973 | Boyer | 455/69 |
| 4,261,054 | 4/1981 | Scharla-Nielsen | 455/69 |
| 4,309,771 | 1/1982 | Wilkens | 455/69 |
| 4,313,224 | 1/1982 | Wakabayashi et al. | 455/603 |
| 4,392,245 | 7/1983 | Mitama . | |
| 4,434,510 | 2/1984 | Lemelson | 455/606 |
| 4,495,648 | 1/1985 | Giger | 455/69 |
| 4,580,262 | 4/1981 | Naylor et al. | 455/69 |
| 4,613,990 | 9/1986 | Halpern | 455/69 |

Primary Examiner—Donnie L. Crosland
Attorney, Agent, or Firm—Beveridge, DeGrandi & Weilacher

[57] ABSTRACT

A device adapted to transmit a signal and a power with an electromagnetic wave or light being as the transmission medium. This device comprises active and passive modules each provided with means for effecting transmission and reception of at least one of the electromagnetic wave or light, and a signal processing circuit. Each module may further comprise an output or frequency control circuit. One of these modules is provided at a moving body such as a rotary body, and the other is provided at a fixed body to effect both signal transmission and power transmission between the moving and fixed sides.

19 Claims, 11 Drawing Sheets

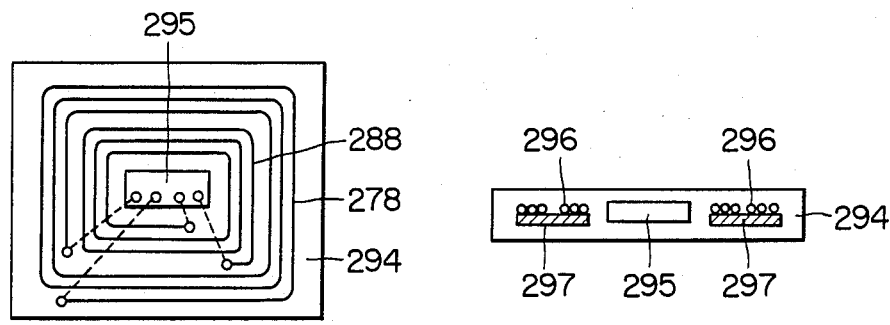
FIG. 32
FIG. 33
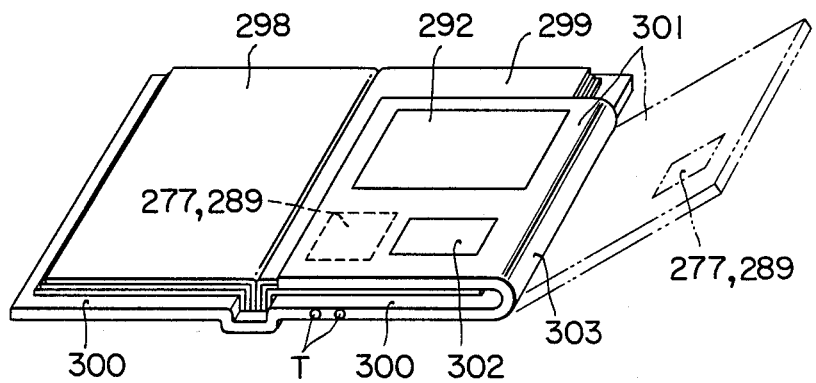
FIG. 34
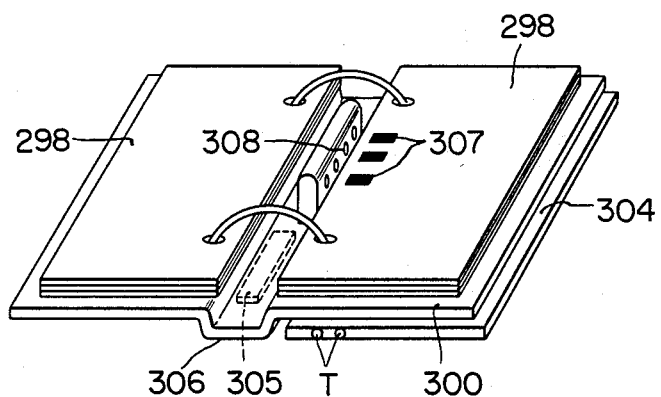
FIG. 35

SIGNAL TRANSMISSION DEVICE

This application is a continuation of application Ser. No. 06/852,009, filed Apr. 14, 1986 now abandoned.

BACKGROUND OF THE INVENTION

The present invention relates to a device adapted to effect transmission of information signals e.g. analog signals, digital signals or digitalized data signals etc. between a plurality of units in a non-contact manner and with high precision by making use of a medium such as electromagnetic waves or light.

In machinery apparatus including a rotary or movable part e.g. stationary equipment, NC machine tools, robot apparatus or conveyer apparatus etc. constituted with combined plural sets of devices, there are instances where it is required to realize signal transmission between the movable part and a stationary part. In such cases, these machinery apparatuses are configured to provide an active module at one side e.g. a stationary side of the apparatus body and to provide a passive module at the other side e.g. a movable part, thereby to transmit power or information signals e.g. control signals etc. in a non-contact fashion from the active module to the passive module using electromagnetic wave or light, and to transmit various data signals such as information signals (e.g. indicative of shape, position, distortion, temperature or color etc.) in a non-contact fashion from the passive module to the active module. Further, integrated circuit cards of the contactless type which can be manufactured by applying the principle of the above-mentioned apparatus have good reliability as compared to integrated circuit cards of the contact type presently used. Accordingly, it is expected that a book made up by filing these cards can be substituted for conventional books as new media of information.

Hitherto, FM telemeters or wireless modems using electromagnetic wave or light as the transmission medium etc. have been used for these transmission devices of this kind. These devices all require a power source such as a battery on the transmission side. For this reason, when they are assembled into the mechanism of e.g. machine tools etc., it is required to provide the battery etc. with a care such that it is easily exchanged. Further, this is uneconomical in that the battery is apt to be dissipated to much extent. Moreover, since the weight of the battery is large as compared to that of the device body, much labor was needed for a dynamic balance when such a device is secured to a rotary body. Particularly, the employment of the FM telemeters etc. results in the complicated circuit configuration and high price. In addition, since the conventional integrated circuit cards are configured such that the transmission of data and power supply is effected through a contact, there is much possibility that failures such as bad contact will occur, resulting in lowering of the responsibility.

SUMMARY OF THE INVENTION

An object of the present invention is to provide a signal transmission device adapted to mutually effect data transmission between active and passive modules which are relatively simple in their circuit configuration with high precision and in a stabilized manner.

Another object of the present invention is to provide a signal transmission device enabling either of the passive and active modules to be operative without provision of a power source.

A further object of the present invention is to provide a signal transmission device which can be easily assembled and effects a high precision data transmission in a stabilized manner, thus providing an improved reliability.

A still further object of the present invention is to provide a product related to the non-contact signal transmission to which the principle of this signal transmission device is applied.

A still more further object of the present invention is to provide an integrated circuit card of contactless type which can be fabricated by applying the principle of this signal transmission device, the integrated circuit card being capable of providing higher reliability than that of the conventional contact type integrated circuit card.

An additional object of the present invention is to provide a book made up by filing the above-mentioned contactless type integrated circuit cards which can be substituted for the conventional books as new media of information.

A device according to the present invention essentially comprises an active module and a passive module. Each module is roughly divided into a transmitting block and a receiving block. Their combination enables transmission and reception (i.e. unidirectional transmission or bidirectional transmission).

The basic operation of the device thus configured will be initially referred to. The receiving block of the passive module is operative to receive a command from the active module to decode the command, thereby allowing the transmitting block to transmit digital or analog data etc. to the active module. On the other hand, the active module is adapted to allow the transmitting block to transmit desired addresses or discrimination codes etc. to the passive module to obtain a response therefrom.

Further, a power required for the operation of the passive module is transmitted from the active module (energized through a commercial power supply, or by a battery or a generating element etc.) on the basis of the electromagnetic conduction system or opto-electro conversion system. To realize this, the following two methods can be adopted.

(a) One method of transmitting power to the passive module always or only when needed in the form of electromagnetic wave or luminous flux by using the transmitting block of the active module with a command being superimposed on the electromagnetic wave or the luminous flux by making use of any suitable method.

(b) Another method of providing a transmitting block for power transmission in the active module to transmit a power via a transmission path different from the transmission path routing the transmitting block for command.

Where a clock common to the active and passive modules is required (e.g. a baud rate is shared when data is serially transmitted), a modulating operation is applied to the electromagnetic wave or the luminous flux for power transmission using the frequency thereof, or the frequency of power transmission is set to a multiple of integer of a clock frequency to be transmitted, thereby making it possible to obtain a common clock by effecting scale matching between the passive and active modules.

Since the present invention has employed electromagnetic wave or luminous flux as the transmission medium as stated above, seven sets of combinations are basically realized in regard of the data or power transmission as follows:

(I) Electromagnetic wave is used for power and data transmission from the active module to the passive module, and luminous flux is used for data transmission from the passive module to the active module.

(II) Luminous flux is used for power and data transmission from the active module to the passive module, and electromagnetic wave is used for data transmission from the passive module to the active module.

(III) Principally, luminous flux is used for data transmission and electromagnetic wave is used for power transmission.

(IV) Principally, electromagnetic wave is used for data transmission and luminous flux is used for power transmission.

(V) Electromagnetic wave or electromagnetic conduction effect is used for all transmission.

(VI) Luminous flux is used for all transmission.

(VII) Combination of plural ones selected from (I) to (IV).

It is appreciated that if the explanation is actually given to the above-mentioned (I) and (II), remaining (III) to (VII) will be self-explanatory.

BRIEF DESCRIPTION OF THE DRAWINGS

In the drawings:

FIGS. 32 and 33 are schematic views illustrating structure of a sheet employed in the electronic file shown in FIG. 31; and FIGS. 34 and 35 are perspective views illustrating an example of the appearance of the electronic file.

DETAILED DESCRIPTION OF PREFERRED EMBODIMENTS

The present invention will be described in detail in connection with preferred embodiments with reference to attached drawings.

Figure 1:
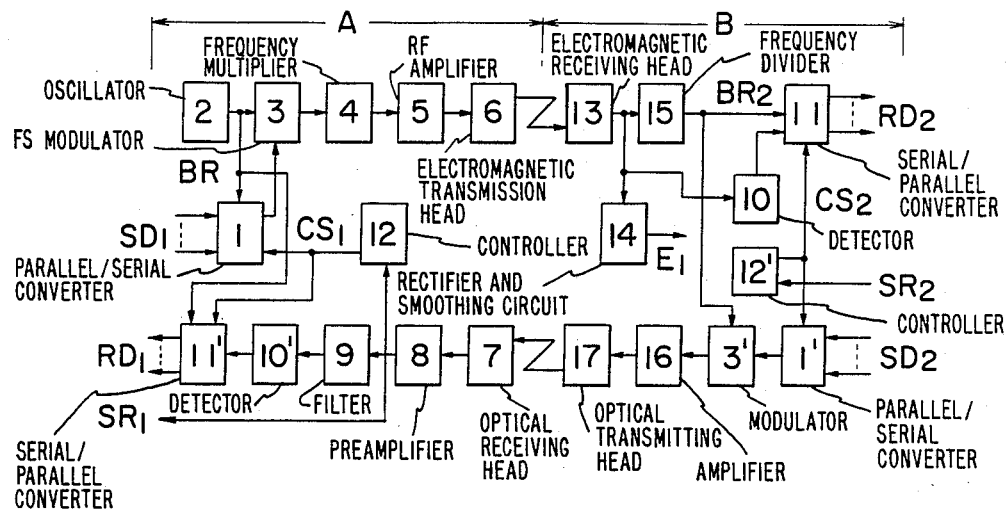
FIG. 1 is a block diagram illustrating an embodiment of a signal transmission device based on a system of transmitting a signal using electromagnetic wave and of transmitting the signal back to the transmitting side using light according to the present invention.

Initially, referring to FIG. 1, there is shown, in a block form, a preferred first embodiment of a signal transmission device according to the present invention. This signal transmission device is a typical one of embodiments which belong to the above-mentioned form (I). This device shown in FIG. 1 is applied to the transmission system using digital data or signal wherein symbols A and B represent active and passive modules, respectively.

This device aims at effecting transmission and reception of digital data between active and passive modules wherein a frequency for power transmission is set to a multiple of integer of a baud rate clock and the F/S (frequency shift) modulation system is used, thus allowing this device to realize signal transmission based on the bidirectional communication system.

In the active module A, input parallel data SD1 are converted into serial data by a P/S (parallel to serial) converter circuit 1. Then, the serial data is input to a F/S modulator circuit 3 driven by an oscillator circuit 2 producing an oscillation signal having a frequency BR1 of a multiple of integer of a baud rate clock, thus to output a F/S modulated wave corresponding to the parallel data.

Since the F/S modulated wave having the above-mentioned frequency is not suitable for spatial transmission in view of transmission efficiency, a scheme is employed in this embodiment to increase frequency by the frequency multiplier circuit 4 to power-amplify the signal by a RF power amplifier 5 to radiate the signal thus amplified toward space through an electromagnetic transmission head 6 as electromagnetic wave.

On the other hand, luminous flux radiated from the passive module B is received by an optical receiving head 7 comprising an optical system and an opto-electro transducer. The luminous flux thus received is converted into an electric signal, and then is amplified to a suitable level by a preamplifier 8. The electric signal thus amplified is demodulated into serial data by an electric filter 9. The demodulated signal is converted into parallel data RD1 by the S/P converter circuit 11, thereafter outputting the parallel data thus obtained. The P/S converter circuit 1 and the S/P converter circuit 11 are controlled by a control timing signal CS1 generated by a controller 12 comprising a microcomputer or the like with reference to a suitable transmit/receive switch signal SR1.

Turning to the operation of the passive module B, the electromagnetic wave for power transmission radiated from the above-mentioned electromagnetic transmitting head 6 is received by an electromagnetic receiving head 13, and a portion of the power received is changed into a dc output by a rectifier and smoothing circuit 14. The dc output is delivered as a power supply voltage E1 to each circuit provided in the passive module.

In this embodiment, the frequency for power transmission is set to a multiple of integer of the baud rate clock as stated above. Accordingly, the frequency for power transmission is reduced by a frequency divider 15 with the same rate as the rate used when it is multiplied by the above-mentioned frequency multiplier circuit 4. Thus, the frequency for power transmission is changed into the same frequency BR2 as that of the original baud rate clock BR1. The signal having the frequency BR2 is delivered to necessary circuits.

ICs for P/S and S/P conversions recently available as LSI enable uses such that synchronization is not damaged even when a frequency of a baud rate clock is somewhat varied. In addition, it is sufficient for frequency shift due to F/S modulation to guarantee only a few percentages. Accordingly, these facts ensure suynchronization between both the modules.

On one hand, a portion of an output of the electromagnetic receiving head 13 is input to a F/S detector circuit 10 by which it is demodulated. The demodulated signal is then converted into parallel data RD2 by a S/P converter circuit 11. The parallel data RD2 thus obtained is output to the external.

On the other hand, parallel data SD2 is converted into serial data by a P/S converter circuit 1'. After the serial data has undergone F/S modulation corresponding to data to be transmitted by a F/S modulator circuit 3', the modulated signal is amplified by a power amplifier 16. The signal thus amplified is transmitted from an optical transmitting head 17 comprising an electro/opto transducer and an optical system to the active module A as a modulated light.

The control of each circuit including the S/P converter circuit 11 and the P/S converter circuit 1' and an external data source is carried out by a control timing signal CS2 generated in a controller 12' operable in response to an external control signal SR2.

Figure 2:
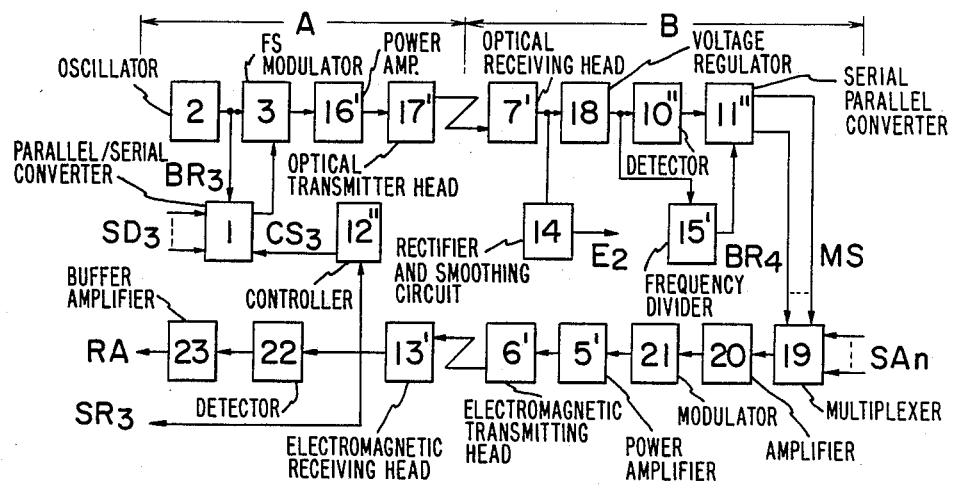
FIG. 2 is a block diagram illustrating an embodiment of a signal transmission device based on a system of transmitting a signal using light and of transmitting the signal back to the transmitting side using electromagnetic wave according to the present invention.

FIG. 2 is a block diagram illustrating a preferred second embodiment of a signal transmission device according to the present invention. This signal transmission device is a typical one of embodiments which belong to the above-mentioned form (II). This device relates to a signal transmission using analog data or signal. This device is basically configured to designate a channel of an analog input related to the transmission by a digital signal from the side of the active module toward the side of the passive module, whereby the passive module transmits the designated analog data to the active module. For transmitting analog data from the passive module to the active module, F/M (frequency modulation) system is employed. For transmitting a digital signal e.g. a command from the active module to the passive module, F/S (frequency shift) system is employed. In the device shown in FIG. 2, symbols A and B represent active and passive modules, respectively.

In this device, the active module is fixed to a movable side of e.g. NC machine tools etc. and the passive module is provided at a stationary or fixed side of the machine body. This device is operative to input an analog value of a channel designated by the passive module to convert the analog value into a suitable voltage value to further convert the voltage value into a form conforming to data transmission, thus to transmit it to the passive module provided at the stationary part.

Where a clock frequency common to both the modules, it is sufficient to modulate luminous flux for power transmission by making use of the frequency to transmit the frequency together with the power in a manner similar to the first embodiment.

In the active module A shown in FIG. 2, a select signal SD3 of an input channel related to the passive module B is converted into serial data by the P/S converter circuit 1. The serial data thus obtained is input to the F/S modulator circuit 3 driven by the oscillator circuit 2 producing an oscillation signal having a frequency BR3 of a multiple of integer of a baud rate clock. Thus, the oscillation signal is changed into a F/S modulated wave corresponding to the select signal SD3. This F/S modulated wave is power-amplified by a power amplifier 16'. The F/S modulated wave is changed into luminous flux by an optical transmitting head 17'. This luminous flux is radiated toward the passive module B.

On the other hand, an electromagnetic wave which has undergone FM modulation by data radiated from the passive module B is received by an electromagnetic receiving head 13' of the active module A. The electromagnetic wave thus obtained is demodulated by a F/M detector circuit 22. The demodulated signal is output as analog data RA to the external via a buffer amplifier 23.

The above-mentioned circuits are controlled by a control timing signal CS3 generated by the controller 12'' comprising a microcomputer or the like with reference to a suitable transmit/receive switch signal SR3.

Turning to the operation of the passive module B, a multiplexer 19 selects one of a plurality of analog input signals SAn. The signal of the selected channel is amplified by an amplifier 20 to a suitable voltage. The voltage signal thus obtained is converted into a carrier wave having a frequency shift proportional to an analog value by a FM oscillation modulator circuit 21. The carrier wave thus obtained is transmitted from the electromagnetic transmitting head 6' to the active module A via the RF power amplifier 5' by the electromagnetic conduction effect.

The luminous flux having a frequency of multiple of integer of a baud rate clock transmitted from the active module as a carrier wave and obtained by applying F/S modulation to the carrier wave by data to be transmitted is received by the optical receiving head 7'. The luminous flux thus received is regulated to a suitable voltage by a voltage regulator circuit 18. A portion of an output of the voltage regulator circuit 18 is frequency-divided by a frequency divider 15'. The frequency-divided output thus obtained serves as a baud rate clock BR4 for the active module. In addition, the other portion of the output of the volt gage regulator circuit 18 is demodulated into the original serial data by a F/S detector circuit 10''. The serial data is converted into parallel data functioning as an input channel switch signal MS by a S/P converter circuit 11'' by making reference to the baud rate clock BR4. In response to the input channel switch signal MS, the multiplexer 19 is operative to switch the analog input channel.

Further, a branched output of the optical receiving head 7' is changed into a dc output E2 by the rectifier and smoothing circuit 14. The dc output E2 thus obtained is delivered to each circuit of the passive module B as an operating power supply.

In the above-mentioned second embodiment, the parallel data to be transmitted from the active module to the passive module and the select signal SD3 for the analog input channel are transmitted on the basis of the F/S modulation system by making reference to the control signal SR3, and the passive module is operative to designate an input analog channel by a multiplexer switch signal MS corresponding to the signal transmitted to transmit the data of the designated channel back to the active module on the basis of the FM system.

As understood from the foregoing description, it is appreciated that the signal transmission device according to the second embodiment is characterized in that a power required for the operation is transmitted from the active module to the passive module, thus enabling the passive module to be operative in a normal condition without the provision of a power source.

When needed, there may be provided an auxiliary power source e.g. a secondary battery or a capacitor having a large capacity etc. which can be changed by the power source E1 or E2 provided in the passive module. Thus, where no power is transmitted e.g. at the time of out of operation of the machine or when the transmitting and receiving heads are not opposite to each other or according to need, such an implementation allows the above-mentioned auxiliary power source to function as an operating power source for each circuit of the passive module.

Figure 3:
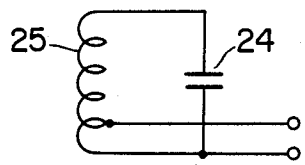
FIG. 3 is a circuit diagram illustrating an example of a transmitting and receiving head used in the present invention.

Various systems may be employed for the electromagnetic transmitting and receiving heads 6' and 13'. Generally, a coil 25 having a capacitor 24 connected in parallel can be used as shown in FIG. 3.

Figure 4:
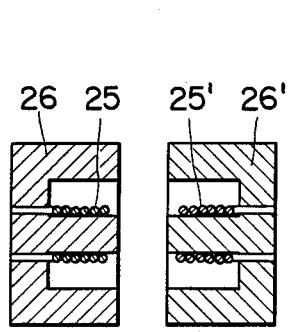
FIGS. 4 and 5 are cross sectional views illustrating examples of configuration of electromagnetic heads of the opposite type and that of the coaxial type, respectively.
Figure 5:
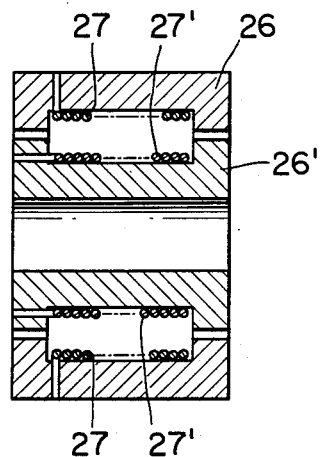

Referring to FIGS. 4 and 5, there are illustrated examples of an electromagnetic transmitting or receiving head of the opposite type and the one of the coaxial type, respectively. In these examples, heads comprising coils 25 and 25' respectively wound onto cores 26 and 26' are used. For these cores 26 and 26', metallic or nonmetallic magnetic material suitably selected according to a frequency used may be employed.

In such a case, where both signal transmission and power transmission are effected by making use of electromagnetic coupling effect based on high frequency or electromagnetic wave, it is desirable to separate frequency for lessening interference therebetween. In this instance, it is desirable to make a setting such that the frequency for signal transmission is lower than the frequency for power transmission in view of harmonics or spurious. Further, where it is required to make a setting such that the frequency for signal transmission is larger than the frequency for power transmission, a desirable result cannot be obtained unless the separation between both the frequencies is considerably large.

Figure 8:
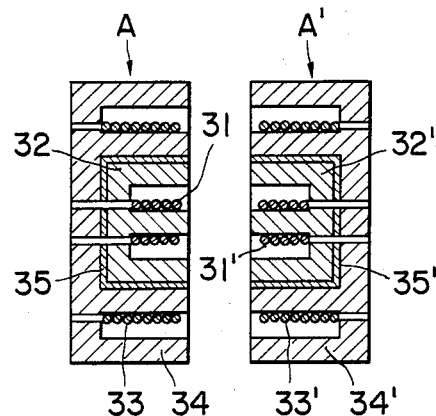
FIGS. 8 and 9 are cross sectional views illustrating other examples of configuration of electromagnetic heads, respectively.
Figure 9:
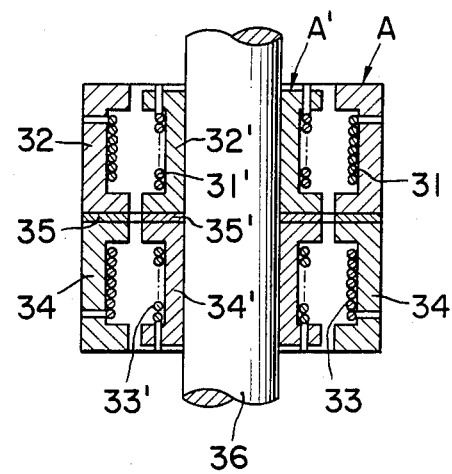

Turning to FIGS. 8 and 9, there are respectively illustrated embodiments of transmitting and receiving heads of the type comprising a plurality of cores combined having different frequency characteristics, and transmitting and receiving coils provided on the respective cores.

These embodiments will be described in connection with the case where the frequency f1 for power transmission is larger than the frequency f2 for data transmission.

Figure 11:
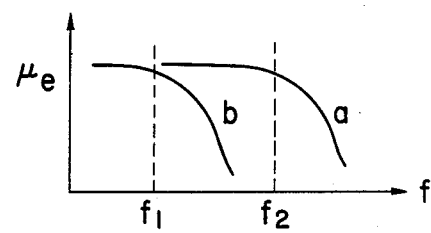

In the embodiment shown in FIG. 8, a magnetic core 32 on which a coil 31 is wound is fitted into a recess provided in the central portion of a magnetic core 34 on which a coil 33 is wound. These magnetic cores 32 and 34 are combined concentrically with each other. In this instance, there is used the magnetic core 34 having a frequency characteristic a better than a frequency characteristic b of the magnetic core 32 as shown in FIG. 11.

Figure 10:
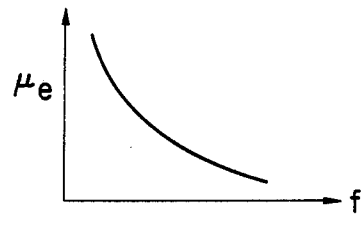
FIGS. 10 and 11 are graphs showing characteristics of magnetic material suitable for the electromagnetic head, respectively.

The coil 31 is connected to an oscillation source having a frequency f1 modulated by a data signal to be transmitted. Likewise, the coil 33 is connected to an oscillation source having a frequency f2 modulated by a data signal to be transmitted. Generally, magnetic material has characteristic such that an effective permeability $\mu e$ lowers inversely in proportion to frequency f as shown in FIG. 10. Further, inductance L of a coil with core is represented by $L = l\mu e$ when a factor related turn and dimension of coil is represented by k. As understood from this relationship, the inductance L is proportional to the effective permeability $\mu e$.

The one magnetic core 34 shown in FIG. 8 has a permeability sufficiently with respect to the frequency f2. However, the other magnetic core 32 has a poor frequency characteristic. Namely, the effective permeability $\mu e$ is considerably low with respect to the frequency f2, with the result that most of magnetic field generated by the coil 33 passes through a portion which is not provided with the magnetic core 34 and then is radiated from the aperture toward air. Accordingly, the component of the frequency f2 induced in the coil 31 becomes small.

On the other hand, the magnetic field having the frequency f1 produced by the coil 31 is irradiated from the aperture toward air. Since the magnetic core 34 has also a sufficient permeability with respect to the frequency f1, the magnetic field is also induced in the coil 33. Accordingly, such a structure can prevent induction in a direction from the coil 33 to the coil 31, but cannot prevent induction in the opposite direction. However, from a practical point of view, where intensity of magnetic field of the frequency f2 is extremely larger than that of the frequency f1, there is no problem in connection with crosstalk of the frequency f1.

Such a problem can be overcome by providing a shield 35 of conductor between the magnetic cores 32 and 34. In use, as shown in FIG. 8, a pair of heads A and A' of entirely the same structure are oppositely disposed to secure one of the heads at the stationary side of a machine and the other at the movable side thereof. Thus, it is possible to transmit a data signal of moving object in regard of two kinds of frequencies to the stationary side, and to reduce crosstalk between two frequencies. In FIG. 8, reference numerals 31' to 35' attached to the head A' of the movable side correspond to reference numerals 31 to 35 attached to the head A of the stationary side, respectively.

An embodiment shown in FIG. 9 comprises a rotary shaft 36, cylindrical magnetic cores 32' and 34' parallelly disposed on the rotary shaft 36, coils 31' and 33' wound on the magnetic cores 32' and 34', respectively, magnetic cores 32 and 34 disposed coaxially with and oppositely to the magnetic cores 32' and 34' through air gaps, respectively, and coils 31 and 33 wound on the magnetic cores 32 and 34, respectively. In this embodiment, by employing a structure such that the magnetic cores 32 and 32' have frequency characteristics higher than those of the magnetic cores 34 and 34', and connecting an oscillation source for the frequency f2 modulated by data to be transmitted to the coil 31, voltages having respective frequencies f1 and f2 are induced across the opposite coils 31' and 33', respectively.

In this embodiment, there occurs a large crosstalk from the coils 33 and 33' to the coils 31 and 31' due to the difference between the frequency characteristics of the coils 31 and 31' and those of the coils 34 and 34'. Accordingly, shields 35 and 35' are provided for preventing this crosstalk. In the above-mentioned embodiments, reference has been made to the system using two different frequencies. In addition, expanding such a system makes it possible to transmit electromagnetic wave having a large number of frequency bands. Generally, there are instances where a ratio of powers to be transmitted is large or transmission direction is not fixed as in the data transmission and the power transmission using electromagnetic wave, e.g. where it is required to effect transmission from the primary side to the secondary side in connection with the frequency f1 and from the secondary side to the primary side in connection with the frequency f2. The above-mentioned embodiment can be advantageously applied to such a case.

Improved implementation of these electromagnetic receiving or transmitting heads is as follows. Namely, irrespective of opposite type or coaxial type, by providing magnetic fluid or magnetic powder in a gap existing between primary and secondary windings wound on opposite portions of the core, it is possible to reduce magnetic circuit resistance, thus further improving transmission efficiency because permeability of the magnetic fluid or magnetic powder is extremely large as compared to that of gas such as air or vacuum.

Figure 12:
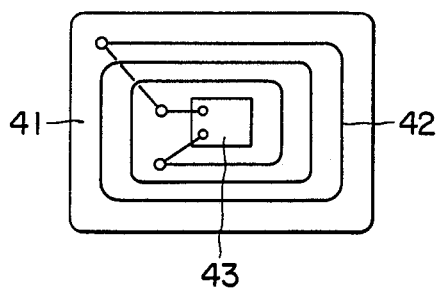
FIGS. 12 and 13 are plan and cross sectional views illustrating an example of the electromagnetic coil constituted with a planar coil.
Figure 13:
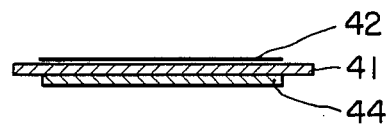

Further, these coils may have a structure of planar type. For instance, as shown in FIG. 12, the planar type coil comprises a base plate 41 of plastic material such as epoxy or insulating material such as ceramic or alumina, and a coil 42 constituted with copper foil or copper wire and a capacitor 43 which are arranged on the base plate 41. Preferably, as shown in FIG. 13, such a planar coil may be configured by additionally providing magnetic material such as ferrite 44, thus enabling increase in inductance.

Figure 6:
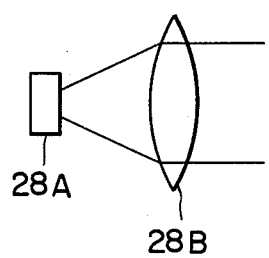
FIGS. 6 and 7 are explanatory views illustrating examples of configuration of optical heads, respectively.
Figure 7:
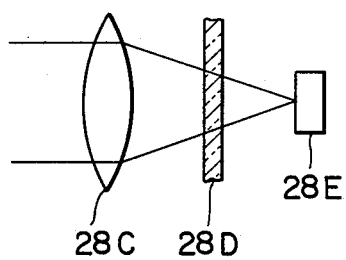

On the other hand, the optical receiving head 17 (FIGS. 1 and 2) may be configured as shown in FIG. 6 or 7. The structure of the head 17 shown in FIG. 6 comprises a lens 28B and an electro/opto transducer 28A e.g. a power LED, a semiconductor laser or a gas laser with a modulator. Further, the structure of the head 17 shown in FIG. 7 comprises a lens 28C, an optical filter 28D for reducing influence of disturbance light to transmit light of a specified wavelength band, and an opto/electro transducer 28E e.g. a phototransistor, a photodiode or a phototube, etc.

In addition to the optical system comprising lens as stated above, a suitable optical system comprising a reflection mirror combined may be used.

In the above-mentioned embodiments, it has been described that the active module A is provided at the stationary side ad the passive module B is provided at the movable side. According to need, however, both the modules may be provided at the movable side or the stationary side. Further, the F/S modulation system or the FM modulation system has been employed for modulation system in the above-mentioned embodiments. However, it is apparent that most of other various modulation systems used in the ordinary radio communication can be applied.

In the embodiment using the head of the opposite type in either case of utilizing electromagnetic wave or optoelectric type, where a distance between the active module and the passive module varies, various problems occur. In a system of delivering a power e.g. a power supply required for the passive module from the active module in a non-contact manner and of receiving data transmitting from the passive module by the active module in a non-contact manner as in the present invention, the influence of a transmission loss increasing in proportion to a distance becomes effective both in the sending path and in the return path. Accordingly, where a distance between both the modules varies or where a manner such that the distance therebetween changes to much extent is implemented, there is a problem that correction of a gain is not completely made. In an extreme case, there are uses such that transmission distance is equal to substantially zero. In such a case, the receiver circuit becomes saturate at its input stage because of an excessive input, with the result that transmission is impossible or changes in a power transmission output affects each portion of the circuit, giving rise to erroneous operations.

Where an input power varies to much extent when viewed from the receiving side, for a countermeasure for effecting transmission in a stabilized manner, there has been employed an AGC (Automatic Gain Control) circuit in the art. However, this can control a gain of only the receiving stage, but cannot cope with great changes in intensity.

To solve this problem, two kinds of countermeasures ($\alpha$), ($\beta$) and ($\gamma$), ($\delta$) as described below have been developed in the present invention.

($\alpha$) The active module is operative to automatically control a sending output of a power for the passive module by making reference to reception intensity of an information signal transmitted from the passive module.

($\beta$) The passive module is operative to receive a power output sent from the passive module to feed a change in the intensity back to the active module, whereby the active module automatically controls a sending output of the power by making reference to the value indicative of the change in the intensity thus fed back.

($\gamma$) The module of the transmitting side detects therein changes in parameter such as a coil or transmission intensity related to the transmission originating from changes in the distance between the passive and active modules or environment conditions etc., thereby to automatically control a self-transmission frequency.

(δ) The module of the receiving side detects changes in a parameter such as a coil or transmission intensity to feed the changes thus detected back to the module of the transmitting side, whereby the module of the transmitting side automatically controls transmission frequency by making reference to the value thus fed-back.

Namely, the systems described in the items (α) and (β) can not only control a gain at the receiving side, but also optimumly vary a power output at the transmitting side depending upon a distance, although only the gain at the receiving side can be controlled with the above-mentioned AGC.

Where a distance between both the modules varies, a correction of inductance of a coil related to the transmission is required from the grounds described below.

Namely, the following equation generally holds in connection with two coils L1 and L2 subject to electromagnetic coupling, when an overall inductance is represented by Lt:

$$Lt = L1 + L2 + 2M \quad (1)$$

Further, when an equivalent tuning capacitor is represented by C, a resonant frequency F at this time is expressed as follows:

$$F = 1/2\pi \sqrt{Lt \cdot C} \quad (2)$$

Here, mutual inductance is defined as a function of a distance. Accordingly, when the distance between both the modules varies, the overall inductance Lt and the resonant frequency F also change. Therefore, assuming that the frequency related to the transmission is fixed, a tuning frequency of the resonant circuit constituting the electromagnetic head varies, resulting in a degraded transmission efficiency. This phenomenon results in a great increment of a transmission loss increasing in proportion to a distance. To solve this problem, it is effective to employ a system to vary the trasmission frequency itself, thus to follow changes in a tuning frequency of the coil as in the systems described in the items (γ) and (δ).

Further, it is apparent that more excellent advantages can be obtained by employing a method of suitably combining the above-mentioned systems (α), (β), (γ) and (δ).

Figure 14:
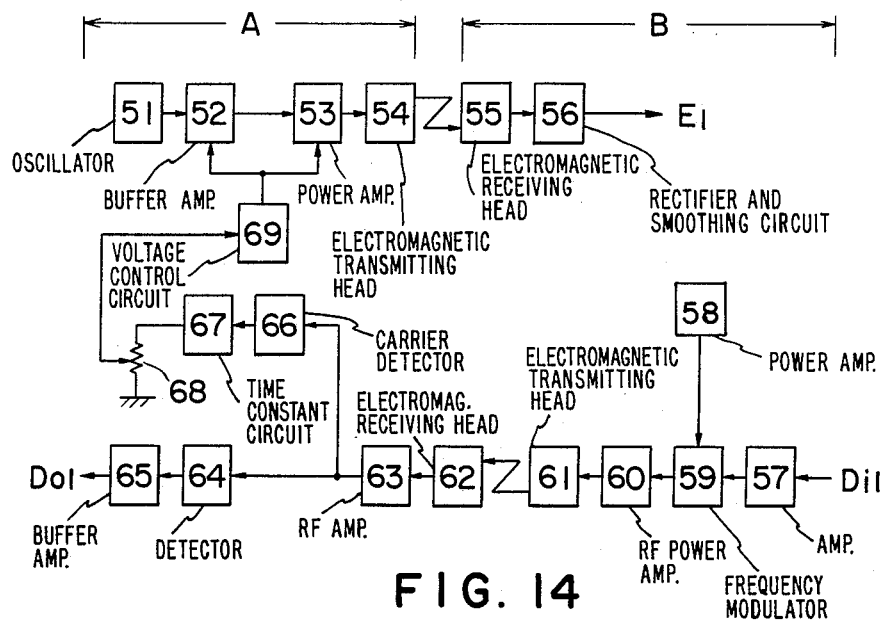
FIGS. 14 and 15 are block diagrams illustrating embodiments of a signal transmission device having an automatic output control function according to the present invention.

Referring to FIG. 14, there is shown, in a block form, an embodiment based on the system (α) according to the present invention wherein a signal transmission device according to the embodiment is provided with means for automatically controlling a sending output of a power on the basis of intensity of an information signal from a passive module B received by an active module A.

The active module A is provided with a power transmitting unit for dealing a power or an information signal, a signal receiving unit for receiving the information signal and the like. On the other hand, the passive module B is provided with a power receiving unit adapted to receive a power or an information signal and apply a predetermined processing thereto, a signal transmitting unit for transmitting the information signal and the like. The power transmitting unit provided in the active module A is operative to power-amplify an output of an f1 oscillator circuit 51 for producing an oscillation output indicative of a frequency for sending power by a RF power amplifier 53 through a buffer amplifier 52 to radiate an electromagnetic wave corresponding to the output thus amplified from an electromagnetic transmitting head 54. After this electromagnetic wave is caught by an electromagnetic receiving head 55 provided in the passive module B, it is changed into a dc output E1 by a rectifier and smoothing circuit 56. The dc output is delivered as an operating power source in each circuit provided in the passive module B. Further, analog data Di1 input from a circuit etc. of a device associated with the passive module B undergoes a necessary processing such as a scaling by an AF (low frequency) amplifier 57. The analog data Di1 thus processed and an output of a f2 oscillation circuit are changed into a FM wave in a FM (frequency modulating) circuit 59. The FM wave thus obtained is power-amplified by a RF power amplifier 60 and then is radiated from an electromagnetic transmitting head 61 toward air.

The FM wave thus radiated is caught by an electromagnetic receiving head 62, and then is amplified by a RF amplifier 63 of the next stage. The FM wave amplified is demodulated into the original data by a FM detector circuit 64. The demodulated data passes through an AF (low frequency) buffer amplifier 65. The output of the buffer amplifier 65 can be observed as output data Do1.

In this instance, a portion of the output of the RF amplifier 63 is detected and is changed into a dc signal by a carrier detector circuit 66. The dc output thus obtained is applied to a control terminal of a voltage control circuit 69 connected in series with a power source for the RF buffer amplifier 52 and the RF power amplifier 53 via a suitable time constant circuit 67 and a variable resistor 68 for power adjustment. As stated above, this embodiment does not vary a bias value, but automatically adjusts a power supply voltage for the RF buffer amplifier 52 and the RF power amplifier 53 by the voltage control circuit 59, thereby to control a RF output.

In such a case, generally, an output from a signal transmission unit provided in the passive module B is substantially proportional to a power which has been transmitted from the active module A. In view of this, a negative feedback is applied to the power transmission unit in an ordinary condition on the basis of intensity of a signal received in the signal receiving unit of the active module A, thus allowing a sending power to be uniform. Accordingly, even when a distance between modules varies, it is possible to keep the intensity of a received signal of the active module A substantially constant.

Where an electromagnetic wave is used as a medium related to power transmission and data transmission carried out in a non-contact manner as in this embodiment, because an output of the power transmission system is large, this output is induced to the data transmission system, there is a possibility that the data transmission system is not desirably operated. This problem can be overcome by using different frequencies in the power and data transmission systems, respectively.

Figure 15:
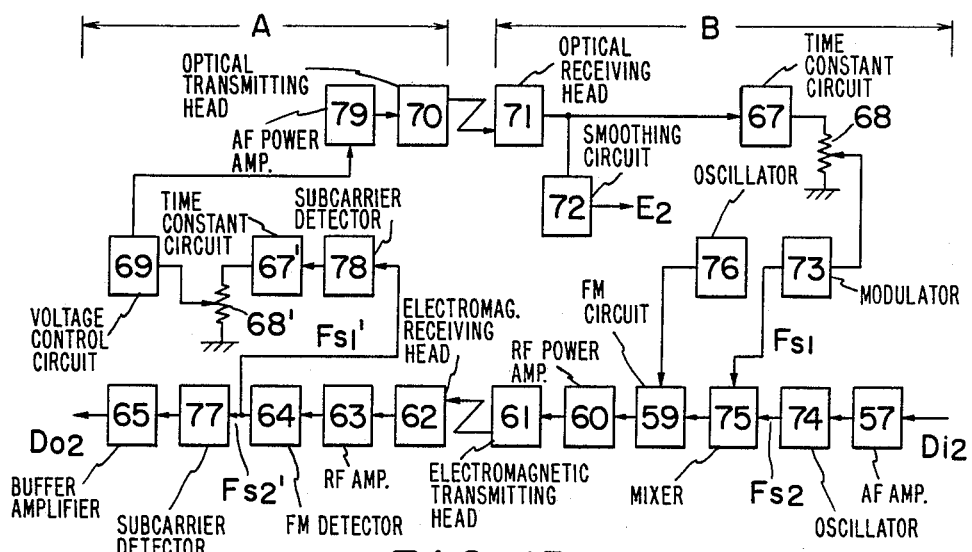

FIG. 15 is a block diagram illustrating an embodiment based on the system (β) wherein a signal transmission device according to this embodiment is operative to receive a change in an output of a power sent from the active module A by the passive module to feed an amount indicative of the change back to the passive module B, thereby to automatically control a sending output of the power.

In this embodiment, light and magnetic wave are used as transmission media for a power transmission system and for a signal transmission system, respectively. In operation, luminous flux for power transmission radiated from an optical transmitting head 70 provided in the active module A is caught by an optical receiving head 71 having an opto/electro conversion function provided in the passive module B. A portion of the output thus caught is changed into a dc voltage E2 by a smoothing circuit 72. This dc voltage E2 is delivered as operating power supply voltage in each circuit of the passive module B and an external circuit associated therewith. Another portion thereof is changed into a modulated wave Fs1 corresponding to an output of the optical receiving head 71 by a subcarrier 1 oscillation modulating circuit 73 via the time constant circuit 67 having a suitable time constant and the variable resistor 68 for gain adjustment.

A data signal Di2 obtained in the external circuit associated with the passive module B undergoes a necessary processing such as a scaling in the AF amplifier 57. The data signal Di2 is changed into a modulated wave Fs2 corresponding to the data signal Di2 by a subcarrier 2 oscillator circuit 74 of the next stage. The modulated wave Fs2 thus obtained and the modulated wave Fs1 are mixed by a mixer circuit 75. An output of the mixer circuit 75 is input to the FM circuit 59 driven by an output of a main-carrier oscillator circuit 76. Thus, a FM wave is obtained. Subsequently, the FM wave is power-amplified by the RF power amplifier 60. The FM wave thus amplified is radiated from the electromagnetic transmitting head 61 toward air as an information signal of the magnetic wave.

The information signal of the electromagnetic wave is received by the electromagnetic receiving head 62 at the active module A. The information signal received is amplified by the RF amplifier 63. The signal amplified is demodulated by the FM detector circuit 64 for main carrier as a mixed wave of the modulated waves Fs1' and Fs2' based on subcarrier.

The modulated wave Fs2' corresponding to the data signal Di2 among these modulated waves is demodulated by the subcarrier 2 detector circuit 77. The demodulated wave passes through the AF buffer amplifier 65. Thus, an output of the AF buffer amplifier can be observed as a data output signal Do2 in the external circuit.

On the other hand, the modulated wave Fs1' corresponding to an output of the optical receiving head 71 is demodulated by the subcarrier 1 detector circuit 78. The demodulated wave is applied to a control input of the voltage control circuit 69 connected in series with a power circuit of the AF power amplifier 69 for the purpose of controlling an output thereof through a time constant circuit 67' and a variable resistor 68' for gain adjustment.

An output of the AF power amplifier 79 is converted into luminous flux by the optical transmitting head 70 having an electro/opto conversion function. The luminous flux thus obtained is radiated from the optical transmitting head 70 toward the active module B.

The passive module B receives changes in a power transmitted from the active module A in a manner stated above to send the changes back to the active module A as intensity of a signal related to an output of a sending power. Thus, the active module A is operative to apply a negative feedback to the power transmitting unit depending upon the value sent back, thereby making it possible to keep intensity of signal related to reception of the active module A substantially constant irrespective of a distance between modules.

Figure 16:
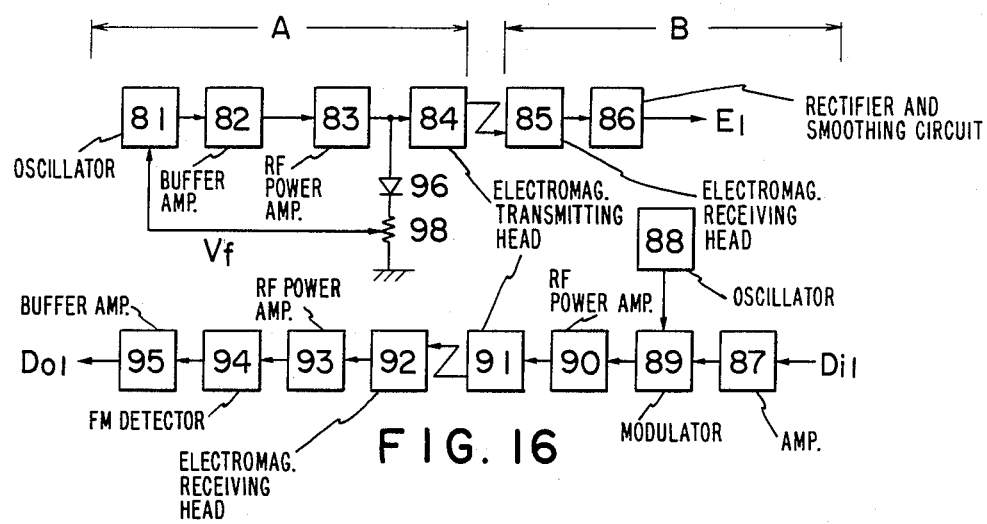
FIGS. 16 and 18 are block diagrams illustrating embodiments of a signal transmission device having an automatic frequency control function according to the present invention.

FIG. 16 is a block diagram illustrating an embodiment based on the system ($\gamma$). A signal transmission device according to the present invention is adapted to detect changes in parameters etc. related to the transmission in the module at the transmitting side, thereby to automatically control a transmission frequency thereat, wherein symbols A and B represent active and passive modules, respectively.

The active module A is provided with a power transmitting unit for handling a power or an information signal, a signal receiving unit for receiving the information signal and the like. On the other hand, the passive module B is provided with a power receiving unit adapted to receive the power or the information signal to apply a predetermined processing thereto, and the like. In the operation, the power transmitting unit provided in the active module A is operative to power-amplify an output of an f1 oscillator circuit 81 of the frequency variable type producing an oscillation output having a frequency for sending power by a RF power amplifier 83 through a RF (high frequency) buffer amplifier 82 to transmit the output from electromagnetic transmitting head 84 to an electromagnetic head 85 provided in the passive module B in the form of electromagnetic wave or by making use of electromagnetic induction. The electromagnetic wave received is changed into a dc output E1 by a rectifier and smoothing circuit 86 connected. The dc output E1 is delivered for an operating power in each circuit which is provided in the passive module B. Further, analog data Di1 input from a circuit etc. of a device associated with the passive module undergoes a necessary processing such as a scaling by an AF (low frequency) amplifier 87. The analog data Di1 thus processed and an output of a f2 oscillator circuit 88 producing an oscillation output having a frequency for power transmission are changed into a FM wave in a FM (frequency modulating) circuit 89. The FM wave thus obtained is power-amplified by a RF power amplifier 90. The FM wave amplified is radiated from an electromagnetic transmitting head 91 toward air.

The FM wave thus radiated is caught by an electromagnetic receiving head 92 provided in the active module A. The FM wave caught is amplified by a RF amplifier 93 of the next stage. The FM wave amplified is demodulated into the original data by a FM detector circuit 94. The demodulated data goes through an AF (low frequency) buffer amplifier 95. Thus, the original data can be observed as output data Do1.

In such a case, when a distance between both the modules varies, assuming that a frequency related to the transmission is fixed, a tuning frequency of a resonance circuit constituting the electromagnetic head changes, resulting in degraded transmission efficiency. In general, an adjustment of a tuning of a coil related to the transmission is made so as to provide an optimum frequency with respect to the transmission frequency in the vicinity of the maximum transmission distance. Where such an adjustment is made, mutual inductance M generally increases when a distance between both the modules decreases. As a result, there occurs a detuning in a direction of increasing inductance i.e. lowering a frequency, and at the same time selectivity is lowered.

Figure 17:
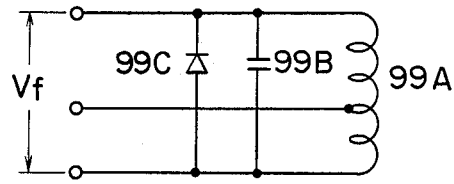
FIG. 17 is a circuit diagram illustrating a frequency variable tuning circuit.

This phenomenon causes degradation of transmission efficiency and a decrease in a high frequency output power of the RF power amplifier 83 resulting therefrom. Accordingly, it is significant to measure a high frequency output power of the RF power amplifier 83, thus to effect an automatic control in a direction of decreasing a frequency in proportion to a reducing rate of the high frequency output power. To realize this, this embodiment is adapted to detect a change in a power by detecting a high frequency output of the RF power amplifier 83 with a diode 96 to feed a feedback voltage $V_f$ obtained by implementing a suitable scaling to the value indicative of the power change with a variable resistor 98 back to the f1 oscillation circuit 81 of the frequency variable type, thus to increase a frequency. There are various circuits for effecting such a frequency control. For instance, as shown in FIG. 17, there is used a circuit constituted by combining a coil 99A and a capacitor constituting a tuning circuit participated with an oscillation frequency of the f1 oscillating circuit 81 with a diode 99C of the variable capacity type to apply a feedback voltage $V_f$ to the circuit. Since the capacity Of the diode 99C of the variable capacity type decreases inversely in proportion to a reverse voltage applied, frequency is increased when the circuit shown in FIG. 17 is used. Accordingly, it is required in this case to apply a reverse bias voltage to the diode 99C in advance, thus allowing the reverse bias voltage to be decreased by the feedback voltage proportional to a decreasing rate of the high frequency output power of the RF power amplifier 83, thereby realizing a control in a direction of lowering the frequency.

The above-mentioned change in the inductance occurs not only in dependence upon a distance between both modules, but also e.g. in the case where metallic cutting rubbish or metallic powder is attached on the module or the module is provided in the vicinity of a conductor such as metal body. In the latter case, there can occur not only the change in the inductance in one direction as stated above, but also increase or decrease in the inductance depending upon the fact that the metal body is magnetic material or not.

In such a case, it is required to constitute a circuit so as to decide the direction of the change to vary a direction of correction. As a simplified implementation, by constituting a self-oscillation circuit including a coil related to the transmission, it is apparent that the inductance related to the transmission follows the change even if it varies to much extent within a range where it does not deviate from an oscillating condition.

Figure 18:
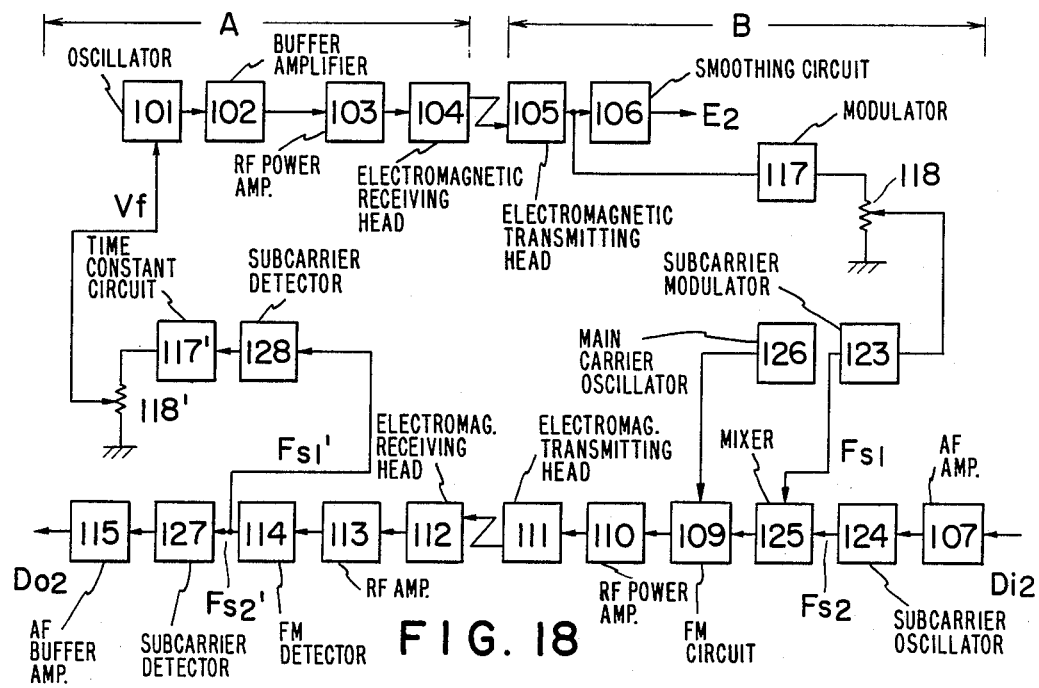

FIG. 18 is a block diagram illustrating an embodiment based on the system (δ) wherein a signal transmission device according to this embodiment is adapted to detect a parameter such as a coil related to the transmission, transmission intensity or the like resulting from a distance between the passive and active modules at the module of the receiving side to feed the value thus detected back to the module of the transmitting side, whereby the module of the transmitting side automatically controls a transmission frequency. In this example, electromagnetic wave is used as media for a signal transmission system and a power transmission system. In FIG. 18, symbols A and B represent active and passive modules, respectively.

The power transmission unit provided in the active module A is operative to power-amplify an output of an f1 oscillator 101 of the frequency variable type producing an oscillation output indicative of a power sending frequency by a RF power amplifier 103 through a RF buffer amplifier 102 to transmit the output thus amplified from an electromagnetic transmitting head 104 to an electromagnetic receiving head 105 provided in the passive module B in the form of electromagnetic wave or on the basis of electromagnetic conduction. Then, a portion of an output of the electromagnetic receiving head 105 is changed into a dc output E2 by a smoothing circuit 106. This dc output E2 is delivered as an operating power in each circuit of the passive module B and an external circuit associated therewith. Further, another portion of the output of the electromagnetic receiving head 105 is changed into a modulated wave Fs1 corresponding to an output of the electromagnetic transmitting head 104 by a subcarrier 1 oscillation modulating circuit 123 through a time constant circuit 117 having a suitable time constant and a variable resistor 118 for gain adjustment.

A data signal Di2 obtained in the external circuit associated with the passive module B undergoes a necessary processing such as a scaling in the AF amplifier 107. The data signal Di2 thus processed is changed into a modulated wave Fs2 corresponding to the data signal Di2 by a subcarrier 2 oscillator circuit 124 of the next stage. The modulated wave Fs2 and the modulated wave Fs1 are mixed by a mixer circuit 125. Then, an output of the mixer circuit 125 is changed into a FM wave by the FM circuit 109 driven by an output of a main carrier oscillator circuit 126. The FM wave thus obtained is power-amplified by the RF power amplifier 110. Then, the FM wave amplified is radiated from the electromagnetic transmitting head 111 toward air as an electromagnetic wave.

The electromagnetic wave thus radiated is received by the electromagnetic receiving head 112 provided in the active module A. Then, an output of the electromagnetic receiving head 112 is amplified by the RF amplifier 113. An output of the RF amplifier 113 is demodulated by a FM detector circuit 114 for main carrier as a mixed wave of modulated waves Fs1' and Fs2' based on a subcarrier. The modulated wave Fs2' corresponding to the data signal Ds2 among these modulated waves is modulated by a subcarrier 2 detector circuit 127. The demodulated output passes through an AF buffer amplifier 115 and is observed by an external circuit of the active module A as a data output signal Do2. On the other hand, the modulated wave Fs1, corresponding to the output of the electromagnetic receiving head 112 is demodulated by a subcarier 1 detector circuit 128. By allowing the demodulated output to pass through a time constant circuit 117' and a variable resistor 118' for gain adjustment, a feedback voltage $V_f$ is obtained. The feedback voltage $V_f$ thus Obtained is applied to a frequency control terminal of the F1 oscillation circuit 101 of the frequency variable type. It is needless to say that the polarity of the feedback voltage $V_f$ or the like is the same as in the above-mentioned embodiment.

As stated above, the signal transmission device according to this embodiment is operative to receive a change in a power sent from the active module A in the passive module B to transmit the change thus received back to the active module A as a signal intensity related to an output of a sending output. The signal transmission device is further operative to apply a negative feedback to an oscillation circuit of the frequency variable type producing an oscillation output indicative of a power sending frequency depending upon the signal intensity in the active module A, thus making it possible to keep the signal intensity related to reception in the active module substantially constant irrespective of a distance between modules.

All the embodiments stated above are directed to compensation for only the power transmission. However, it is apparent that it is possible to compensate the signal transmission at the same time on the basis of the same principle.

Further, the signal intensity is used to provide a negative feedback for making a frequency correction in the above-mentioned embodiments based on the systems ($\gamma$) and ($\delta$). In addition to such an implementation, these embodiments may be configured to detect a change in inductance itself of a coil related to transmission, thus to provide a feedback.

In these devices according to the above-mentioned embodiments, an ordinary AGC directed to only a receiving system in each module may be used together with the above-mentioned control.

In general, transmission of measurement data is carried out by a signal transmission device having such transmitting and receiving units on the premise that relative position such as antennas or opposite coils directly participated with the transmission is always in a coupling condition. In a condition departing from a predetermined positional relationship, it is ordinary that communication therebetween is ceased. Accordingly, where an attempt is made to transmit a data signal continuously measured from the transmitting unit provided at the moving side of a machinery apparatus to the receiving unit provided at the stationary side thereof, when the relative position between transmitting and receiving units deviates from the coupling condition, signal transmission is interrupted, with the result that continuous measurement data cannot be obtained.

A signal transmission device according to the embodiment described below is characterized in that a module at the side of transmitting data is provided with means adapted to accumulate sampling data in a data storage unit to transmit the data stored to the other module in response to a transmission command signal. With this signal transmission device, it is possible to continuously sample and process even a data signal when a relative position of antennas, coils or a light emitter and a light receiver which directly rules transmission and reception of a signal between both modules changes and deviates from the coupling condition.

In this embodiment, electromagnetic wave is used for transmission of power and data from the active module to the passive module, and luminous flux is used for transmission of data from the passive module to the active module.

Figure 19:
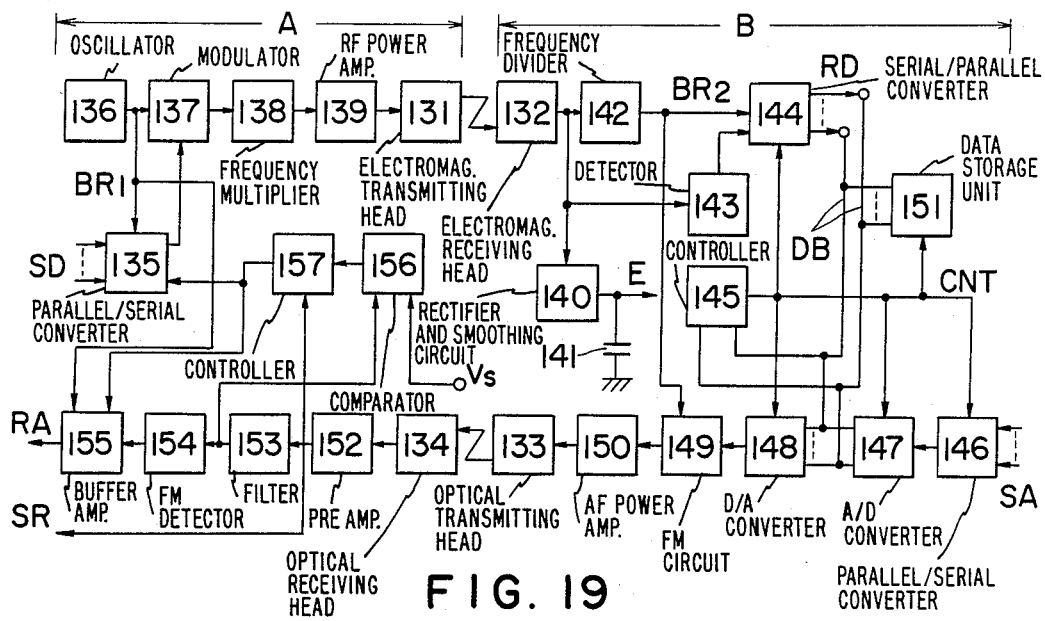
FIGS. 19 and 20 are block diagrams illustrating embodiments of a signal transmission device having a function of effecting an automatic control of power intensity.

As shown in FIG. 19, the main part of the signal transmission device according to this embodiment comprises an active module A and a passive module B. The active module A has a function to transmit a power or a command signal SD to which F/S (frequency shift) modulation is implemented from an electromagnetic transmitting head 131 of the active module A to an electromagnetic receiving head 132 of the passive module B in a non-contact manner on the basis of electromagnetic conduction. On the other hand, the passive module B has a function to input measured data SA obtained from an external instrumentation sensor or a measurement instrument to transmit the measured data SA from the optical transmitting head 3 to an optical receiving head 134 of the active module A in a non-contact manner with modulated light which has undergone FM (frequency modulation) being as a transmission medium. These functions of both the modules will be described in detail.

In the active module A, parallel data SD functioning as a command signal for the passive module B is first converted into a serial signal by a P/S (parallel to serial) converter circuit 135. The serial signal is input to a F/S modulating circuit 137 driven by an oscillator circuit 136 producing an oscillation output having a frequency BR1 of multiple of integer of a baud rate clock. The F/S modulating circuit 137 produces a F/S modulated wave corresponding to the parallel data. Where the frequency thus obtained is not suitable for spatial transmission in view of transmission efficiency, it is required to increase a frequency of the FS modulated wave by a frequency multiplier circuit 138 to power-amplify the F/S modulated wave thus obtained by a RF power amplifier 139, thereafter to radiate the F/S modulated wave amplified from the electromagnetic transmitting head 131 toward air as an electromagnetic wave. The F/S modulated wave thus radiated is received by the electromagnetic receiving head 132 of the passive module B. A portion of the received F/S modulated wave is changed into a dc output for power by a rectifier and smoothing circuit 140 to charge a secondary battery and a large capacity of a capacitor 141 associated therewith. The dc output is also delivered as a power source for each circuit of the passive module B. Since the frequency for power transmission is set to a value of a multiple of integer of a baud rate clock as stated above, it is frequency-divided by a frequency divider 142, thereby to change the frequency into the same frequency BR2 as that of the original baud rate clock BR1 to deliver the frequency signal thus obtained to necessary circuits. Further, a portion of the output of the electromagnetic receiving head 132 is demodulated into the original serial data of the F/S detector circuit 143. Then, the parallel data RD of a command signal restored by the S/P converter circuit 144 is input to a controller via a data bus DB to control related circuits by a control signal CNT corresponding to the contents individually judged. Namely, when the parallel data RD represents an instruction to transmit the measured data SA to the active module A, the measured data SA passes an A/D (analog to digital) converter 147 and a D/A (digital to analog) converter 148 without stopping, and then is changed into a FM wave corresponding to data to be transmitted by a F/M circuit 149. The FM-wave thus obtained is power-amplified by an AF power amplifier 150. The FM wave thus amplified is transmitted by the optical transmitting head 133 to the optical receiving head 134 in a non-contact manner.

In this instance, when the relative positional relationship between the optical transmitting heads 133 and the optical receiving head 134 deviates from the coupling condition, a continuous transmission therebetween is interrupted. However, the signal transmission device according to this embodiment has an ability of covering such an inconvenience. Namely, the device of this embodiment is configured to input measured data at a predetermined timing by the controller 145 to convert the measured data into digital values by the A/D converter 147, thereafter to sequentially store these digital values in a data storage unit 151 through the data bus DB. Every time the coupling between both the heads 133 and 139 is established, the device of this embodiment outputs a transmission command signal in correspondence with a transmission start command produced always or every prescribed fixed time periods to sequentially read the measured data stored in the data storage unit 151. The measured data thus read is converted into an analog value by the D/A converter 148. As previously described, the analog data thus obtained is transmitted from the optical transmitting head 133 as light to be modulated i.e. luminous flux. This luminous flux is received by the optical receiving head 134, and then is converted into an electric signal. The electric signal thus obtained is amplified to a suitable level by a preamplifier 152, thereafter allowing the electric signal amplified to pass through an electric filter 153, thus to lessen the influence of the disturbance light or the like. The electric signal is then demodulated by a FM detector circuit 154. After the demodulated signal passes through a buffer amplifier 155, it is detected as an analog signal RA. As previously described, the transmission between the transmitting and receiving heads is carried out only when the coupling therebetween is established. The judgement as to whether such a coupling is established or not is made as follows. First is to compare an output of the electric filter 153 with a predetermined reference voltage VS by a comparator 156, thereby to detect reception intensity of the luminous flux received by the optical receiving head 134. When the coupling between both the heads is initiated and then the degree of the coupling is above a predetermined level, the controller 157 is operative to output a transmission command signal instructing start of the transmission of the measured data stored to the passive module B. A symbol SR represents a switch signal for transmission and reception in such an operation. The controllers 157 and 145 are constituted with a combination of logic circuits or a microcomputer. Since the storage unit of the digital type is employed, the A/D converter and the D/A converter are required for memorizing analog measured data. When an analog memory is used, it is of course that these converters are not required, with the result that the circuit configuration can be facilitated. The large capacity of the capacitor 140 serving as an operating power source for a time period during which the relative positional relationship of both the heads deviate from a predetermined condition may be substituted for a primary or secondary battery having a suitable capacity or voltage. The signal transmission device of this kind operative to transmit information in a non-contact manner is effective only when both the heads for transmission and reception form a predetermined coupling condition. However, the signal transmission device according to this embodiment functions to continuously sample data even when the relative positional relationship of both the heads deviates from the coupling condition. Accordingly, even when applied to machinery apparatus comprising an active module provided at one side e.g. a stationary side and a passive module provided at the other side e.g. a movable side, and having a time period during which the passive module is moved some extent with respect to the active module thereby the passive module deviating from the coupling condition, the signal transmission device according to this embodiment can accumulate the data in a decoupling condition in the storage unit to read the data therefrom in an adequate manner, by suitably setting the capacity of the secondary battery or the large capacity of the capacitor. Particularly, this embodiment is adapted so that transmission enabling condition based on a relative positional relationship between the modules can be detected at the side of the passive module, thereby to realize such a circuit configuration to intermittently operate an element or elements related to the power transmission only during such a time period, thus temporarily producing a powerful power as compared to that produced in the case of the continuous operation.

There is a possibility that such a signal transmission device is installed in various environment where a power which can be transmitted for power transmission is limited in view of the Japanese radio law, whereas a long transmission distance is required, the environment where the presence of metal etc. of a structural member in the vicinity of an antenna or a coil etc. related to the transmission allows transmission loss resulting from an eddy current loss factor or a skin effect etc. to be increased, or the like. There are instances where the transmission efficiency is remarkably degraded depending upon the installation conditions as stated above.

An embodiment according to the present invention to which a principle described below is applied is suitable for use in such a case.

Namely, a receiving head of the active module charges a power continuously delivered from a transmitting head disposed oppositely to the receiving head into a charging equipment such as a capacitor or a battery. When the charge reaches a suitable threshold level, a circuit related to transmission of a data signal is caused to be intermittently operative at a suitable timing, thus to effect a signal transmission from the transmitting head toward the passive module for a relatively short time period. The provision of such a circuit configuration makes it possible to control the transmitting operation in a stabilized manner, even when an average power received by the active module is small. In this instance, assuming that an amount of a power transmitted from the passive module to the active module is substantially constant, the smaller the average power transmitted is, the smaller a ratio of discharging time to a charging time of the charging equipment i.e. a duty factor is. Generally, this is not a serious problem except for a special case where an extremely high speed response is required.

In regard of the configuration based on the above-mentioned principle, there are basically three kinds of systems described below.

(1) A charge judgement circuit is used to judge the charging condition of the charging equipment, thus allowing the passive module to drive a circuit related to the transmitting operation of a data signal.

(2) A timer circuit is used for determining timings of a charging time of the charging equipment and of a drive time i.e. a discharging time of a circuit related to transmission of a data signal.

(3) As means different from the above-mentioned timer circuit, a detector circuit for detecting that respective transmitting units are opposite to each other is provided to determine timings of charging and discharging times on the basis of the detection signal.

Embodiments based on the above-mentioned systems will be described in connection with a so called unidirectional transmission as an example for the brevity of explanation wherein the unidirectional transmission is defined as a transmission such that a power is transmitted from the passive module to the active module and the active module is operated by the power transmitted to transmit a predetermined data signal to the passive module.

EMBODIMENTS

Embodiment 1

Figure 20:
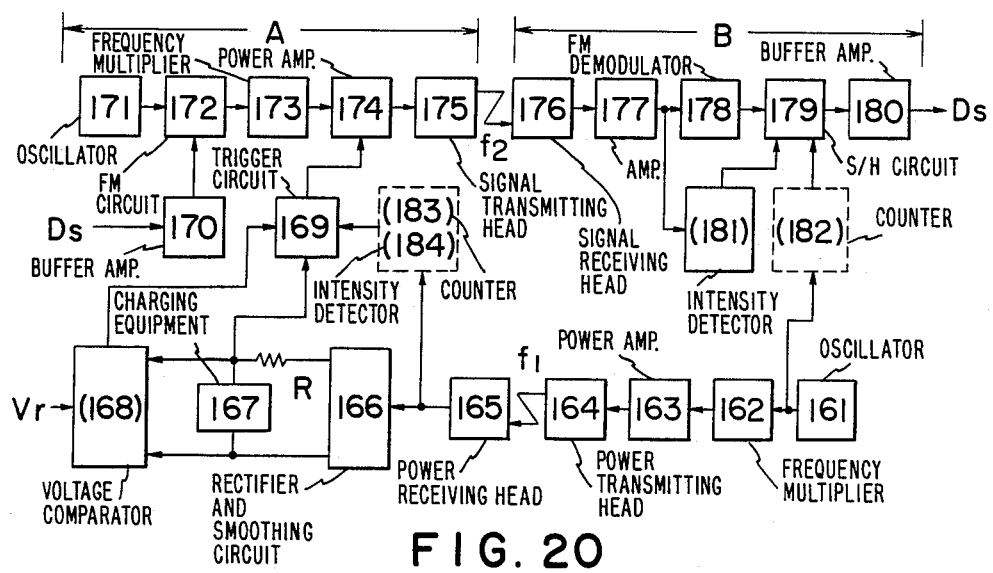

FIG. 20 is a block diagram illustrating an embodiment of a signal transmission device comprising an active module A provided at a moving side and a passive module B provided at a stationary side of a machinery apparatus.

The passive module B principally functions to deliver a power required for the operation of the active module A thereto by making use of a carrier wave f1 for power, and to receive a carrier wave f2 for signal modulated by a data signal received in the active module A to demodulate the carrier wave f2, thus to output the demodulated carrier wave.

On the other hand, the active module A principally functions to receive a carrier wave f1 for power transmitted from the passive module B to apply rectifying and smoothing processing to the carrier wave f1, thereafter to deliver a dc output thus obtained as a power supply voltage for each unit, and to transmit the carrier wave f2 for signal using a data signal as a FM wave toward the passive module B. The detail of these functions is as follows.

Namely, an output of a f1 oscillator circuit 161 producing an oscillation output having a frequency of a multiple of integer of the power carrier wave f1 is multiplied into a carrier wave f1 having a frequency suitable for spatial transmission by a f1 frequency multiplier circuit 162. The carrier wave f1 thus obtained is amplified to a required power level by a f1 power amplifier 163. The carrier wave f1 amplified is radiated from a power transmitting head 164 as an electromagnetic wave. The magnetic wave radiated is received by a power receiving head 165. The received power is changed into a dc output by a rectifier smoothing circuit 166 to charge a charging equipment such as a capacitor or a battery. The charging voltage is compared with a reference voltage Vr by a voltage comparator 168. When the charging voltage is above the reference voltage Vr, a trigger circuit 169 becomes conductive, thereby to intermittently deliver a power to a f2 power amplifier 174 to operate the f2 power amplifier 174.

In this instance, where the charging equipment 167 is constituted with a capacitor, assuming that the capacity of the capacitor and an electric charge to be charged are represented by C and Q, respectively, the value of the electric charge immediately before discharging is expressed as $$Q = C \cdot VR.$$

Further, a time constant T of a received current related to a charging and discharging interval is expressed as $$T = C \cdot R \cdot \log(Vr/Vs),$$

where R represents an impedance of a resistor or a circuit constituting a time constant circuit, and Vs a power supply voltage based on a power from the passive module B applied to the time constant circuit. Accordingly, assuming that an electric charge Q required for transmission is fixed, an interval upto discharge based on intensity of a power transmitted, i.e., an interval of a signal transmitted from the active module A to the passive module B varies. However, such a change in the interval does not cause problem because it is sufficiently fast as compared to a changing rate of a data signal Ds obtained in the active module A.

In the block diagram shown in FIG. 20, blocks 182, 183 and 184 shown by dotted lines represent circuits employed in a different embodiment to be described later, and therefore each circuit is not related to this embodiment. For transmitting a data signal Ds obtained from the external to the passive module B, the active module A which has retained a power required for operation in a manner stated above operates as follows. First is to amplify the power by an input buffer amplifier 170 to input the power amplified to a FM circuit 172 driven by a f2 oscillator circuit 171 producing an oscillation output having a frequency obtained by dividing the signal carrier wave f2 by integer, thus to change it into a FM wave corresponding to the data signal Ds. However, since the frequency of the output thus obtained is not suitable for spatial transmission in view of transmission efficiency, an operation is conducted to increase the frequency by using a f2 frequency multiplier circuit 173 for obtaining a required frequency shift. Where the trigger circuit 169 is conductive in the manner as stated above, the f2 power amplifier 174 becomes operative to effect power amplification, thus to radiate the power amplified from the signal transmitting head 175 toward the passive module B as an electromagnetic wave. The signal carrier wave f2 thus radiated is received by the signal receiving head 176. The signal carrier wave f2 is amplified by a high frequency amplifier 177. The signal carrier wave f2 thus amplified is demodulated into a signal corresponding to the data signal Ds by a FM demodulating circuit 178. By allowing the signal thus obtained to pass through a SH (sample and hold) circuit 179 having a hold function and a buffer amplifier 180, the signal is output as data. Since the outputting operation related to the signal transmission of the active module A is intermittently carried out, it is required to detect an amplified output of a received signal from the high frequency amplifier 177 by using a f2 intensity detector circuit 181 to produce a gate pulse at a timing obtained when the value detected is above a predetermined level, thus to effect a sample and hold operation.

Embodiment 2

There are instances where the signal transmission device is not adapted to the environment equipment depending upon use conditions unless the above-mentioned interval is fixed. To cover such a case, it is sufficient to provide a configuration adapted to determine timings of a charging time and a drive time of a circuit related to signal transmission by using a sujitable timer circuit. This is accomplished, instead of the voltage comparator 168 and the f2 strength detector circuit 181 in FIG. 20, by connecting the A counter 182 and the B counter 183 shown by dotted lines in the same figure, respectively. Namely, the oscillation frequency of the f1 frequency oscillator circuit 161 provided in the passive module B is set in advance to a value obtained by dividing the frequency of the power carrier wave f1 by integer. The passive module B employed in this embodiment is configured to multiply the frequency thus set by integer by the f1 oscillation multiplier circuit 162 to transmit the power carrier wave f1 thus obtained, and to frequency-divide an oscillation frequency of the f1 oscillation circuit 161 by the A counter 182 On the other hand, the active module A employed in this embodiment is configured to obtain the frequency of the power carrier wave f1 caught by the power receiving head 165 as a frequency which is frequency-divided by integer.

In this instance, by selecting frequency reducing ratio of the A counter 182 and the B counter 183, it is possible to obtain a frequency common to the both modules. Accordingly, the inverse of the common frequency can be used as a common interval Thus, in connection with a data signal received by the signal receiving head 176 in the same manner as stated above, the active module B is operative to drive the SH circuit 179 at a receiving timing related to the interval to effect a sample and hold operation, thus to output the data signal which has undergone the sample and hold operation through the output buffer amplifier 180. This embodiment is different from the above-mentioned embodiment in the factor for determining an interval. Namely, the interval in this embodiment is determined exclusively by the A and B counters. Unless a received power i.e. a charging time influenced by the set-up condition of the active module and the like is set in advance to a sufficient value, there occurs the lack of power at the time of signal transmission. As a result, there is the possibility that the operation becomes unstable. It is necessary to take a countermeasure for eliminating the possibility.

Embodiment 3

In the above-mentioned two embodiments, intervals employed therein are determined by time constant related to charging operation or a timer circuit. However, there are instances where such a system of determining time constant is not suitable in view of use conditions. For instance, such an inconvenience occurs e.g. in the case of employment of an apparatus having a mechanism such that a moving body is reciprocated relative to a stationary body or both bodies pass each other. To cover such a case, a system is employed to detect the moment both the bodies are opposite to each other to use an internal circuit etc. operative on the basis of the detection signal, thereby to obtain a timing related to a charging time for the charging equipment and a circuit concerned with transmitting operation of a concerned signal.

Then, an embodiment for realizing this will be described wherein there is employed in this embodiment a method using a detector circuit constituted by removing the circuits 182, 183 and 168 from the device shown in FIG. 20 to instead connect the f2 intensity detector circuit 181 and the f1 intensity detector circuit 184.

An electromagnetic field of a power carrier wave f1 transmitted from the passive module B to the active module A is maximum when the power transmitting and receiving heads 164 and 165 are opposite to each other. Accordingly, when an output of the f1 intensity detector circuit 184 is above a predetermined level, the active module A is operative to drive the trigger circuit 169 to deliver an electric charge stored in the storage equipment 167 to the f2 power amplifier 174 to operate it. On the other hand, also in the passive module B, an electromagnetic field of the signal carrier wave f2 is maximum when the signal transmitting heads 165 and 176 are opposite to each other. Accordingly, the passive module B is operative to detect an output of the high frequency amplifier 177 by using the f2 intensity detector circuit 181 to drive the SH circuit 179 when the signal detected is above a predetermined level to sample and hold an output of the FM demodulating circuit 167 to output the value which has undergone the sample and hold operation through the output buffer amplifier 180 as a data signal Ds. As stated above, the provision of means for detecting respective transmitting units of both the modules are opposite to each other, making it possible to perform a predetermined signal transmission. Such an effect can be attained not only by making use of the external circuit as previously described, but also on the basis of an application of a detector circuit additionally provided with a timing detection element such as a suitable sensor or switch to each transmitting unit, or by making use of a circuit configured by suitably combining such circuit means.

In the above-mentioned embodiments, it has been described that modules represented by symbols A and B among a plurality of modules function as active and passive modules, respectively. In addition to such an implementation, there may be instances where both the modules function as active or passive modules.

Figure 21:
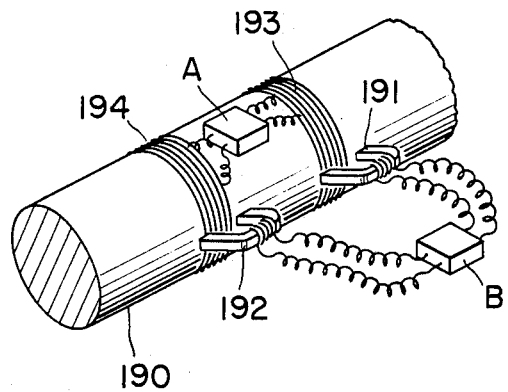
FIGS. 21 and 22 are perspective views illustrating an example of a structure comprising coils or a coil provided on a rotary shaft and an electromagnetic head arranged in the vicinity of the coils or the coil.
Figure 22:
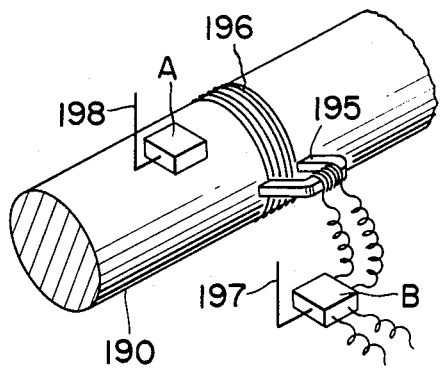

Further, referring to FIGS. 21 and 22, there are illustrated different embodiments according to the present invention. The embodiment shown in FIG. 21 comprises an active module A provided in association with a shaft 190 of a certain mechanism, and a power receiving coil 193 and a signal transmitting coil 194 (corresponding to the power receiving head 165 and the signal transmitting head 175 shown in FIG. 20) wound onto the outer periphery of the shaft 190, respectively.

In this embodiment, in the case of the installation condition where each transmitting unit of the passive module B can occupy only a certain range of the outer periphery of the shaft 190 from the restriction of the structure or the like, it is preferable to separately provide a power transmitting head 191 and a signal receiving head 192 which are constituted with ferromagnetic material as shown. Further, the structure of each transmitting unit according to this embodiment is not limited to that of the closed type like the above-mentioned coil. For instance, a transmitting unit of an opening type like an ordinary antenna can be sufficiently applied by implementing a countermeasure e.g. selection of a frequency related to signal transmission or improvement in sensitivity and selectivity of the signal transmission system.

On the other hand, the embodiment shown in FIG. 22 is similar to the above-mentioned embodiment shown in FIG. 21 wherein signal receiving and transmitting antennas 197 and 198 are used for the signal transmission system. Such an implementation has a less influence of induction from the power transmission system to the signal transmission system. Accordingly, even if the signal receiving antenna 197 is provided in the vicinity of the power transmitting head 195, the signal receiving antenna 197 is provided close to the power receiving coil 196 or is wound together therewith, or the like, a stabilized operation can be performed.

The following embodiment is preferably applied to a signal transmission device employed in automatic machines for production or the like wherein the signal transmission is carried out to optoelectrically observe a situation or a defect of a product machined on a rotary moving table to transmit, in a non-contact manner, data thus observed to a stationary unit. Namely, in a mechanism of a production machine etc. including a moving unit and a stationary unit, the signal transmission device has a function to receive a power or a command signal transmitted from an active module provided at the stationary unit in the form of an electromagnetic wave. The signal transmission device is further with a passive module comprising a movable receiving unit, an optoelectric observation unit and a movable transmitting unit. This passive module is provided e.g. on a rotary table, a moving unit or the like. The optoelectric observation unit comprises at least one light emitting source such as a light emitting element e.g. LED, laser, or lamp etc. or a light emitting array for optoelectrically measuring defect, shape, or color etc. of a product to be inspected, a light receiving element e.g. a phototransistor, a photodiode, a solar cell, a light receiving array or a CCD (Charge Coupled Device) for converting a light obtained by allowing an irradiating light to transmit an object to be inspected or a reflected light from the object to be inspected into a signal voltage, and a processing circuit for these optoelectric elements.

The movable transmitting unit has a function to modulate an electromagnetic wave having a frequency suitable for spatial transmission by making use of the signal voltage etc. detected in the optoelectric observation unit, and to transmit the information signal thus obtained to the active module in a non-contact manner. On the other hand, the active module comprises stationary transmitting and receiving units. Namely, the stationary transmitting unit has a function of transmitting a power or a command signal oscillated and amplified by an ordinary power supply voltage delivered through a lamp wire etc. to the movable receiving unit in the form of an electromagnetic wave. Further, the stationary receiving unit is configured to demodulate the information signal transmitted in a non-contact manner from the movable transmitting unit in the forms of the electromagnetic wave to take out the demodulated signal as observed data.

Embodiment 4

Figure 23:
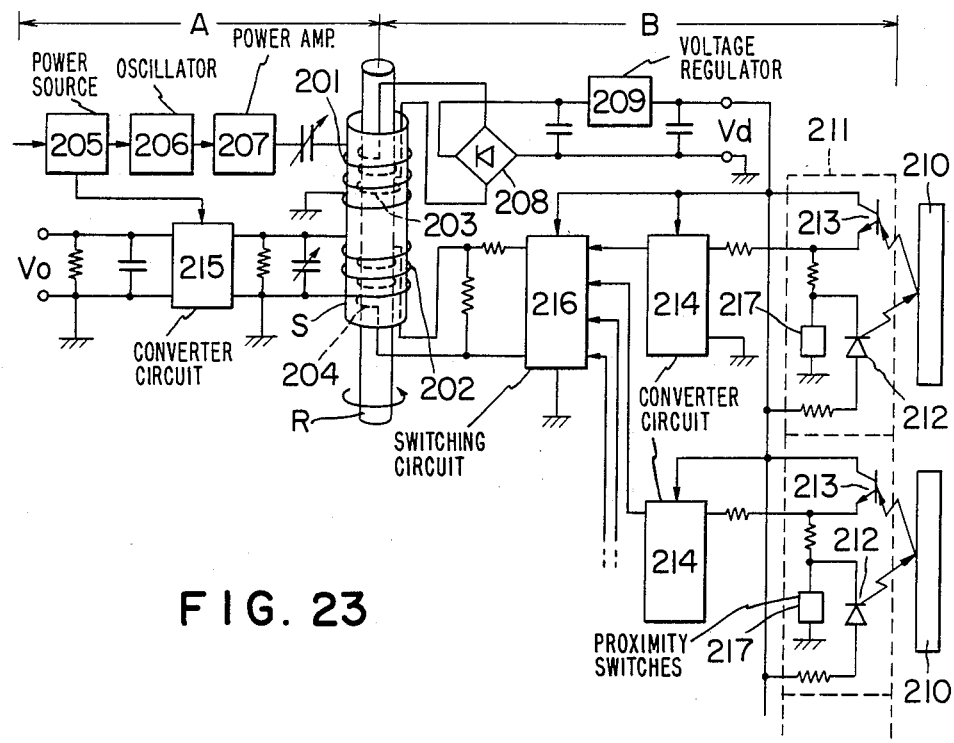
FIGS. 23 and 24 are block diagrams illustrating circuit construction of embodiments for effecting signal transmission between an object moving on a movable body and a stationary unit.

In a signal transmission device shown in FIG. 23, the right-hand part B represents a passive module mounted on a rotary moving table of an automatic machine and the left-hand part A an active module provided at a stationary unit. The transmission and reception of power and signal between both the modules are carried out through two pairs of concentric coils described below. A fixed oscillation coil 201 and a fixed receiving coil 202 are wound onto the same fixed cylindrical body S with a space therebetween. The cylindrical body S having the coils 201 and 202 wound thereon is fixed to the machinery apparatus. Within the fixed cylindrical body S, movable receiving and transmitting coils 203 and 204 rotating with an observation axis R of the rotary moving table are concentrically disposed in a manner that they are substantially opposite to the above-mentioned coils 201 and 202, thus effecting a non-contact transmission therebetween. In this instance with respect to the fixed receiving coil 202 and the movable receiving coil 203, there are employed arrangement of magnetic core and implementation of an electromagnetic shield suitable for transmission frequencies for these coils 202 and 203 with a view for improving reception efficiency and effecting discrimination between different frequencies. First is to activate each circuit of the active module A by using a power source 205 energized through an ordinary lamp wire or constituted utilizing a power of an ordinary battery. On the other hand, each circuit of the passive module B is adapted to be operated by a power transmitted from the fixed oscillation coil 201 to the movable receiving coil 203. For instance, an electromagnetic wave having a frequency of 4 MHz is caused to be produced from an oscillator circuit 206 of the stationary transmitting unit to transmit an output of 2.5 watts obtained by amplifying a power corresponding to the electromagnetic wave thus produced with a power amplfier circuit 207 to the movable receiving unit in the form of an electromagnetic wave. According to an experiment, a power of about 0.1 watt is received by the movable receiving coil 203. This is an amount of a power supplied sufficiently for ensuring the operation of each circuit. Next is to change the received power into a dc output by using a rectifier and smoothing circuit 208. The dc output is regulated to a predetermined dc voltage Vd by a voltage regulator 209. The dc voltage Vd thus obtained is used as a power source for operating the optoelectric observation unit and the movable transmitting unit. In this instance, the voltage regulator 209 is provided with a secondary battery charged by the dc voltage. This secondary battery is configured as a stable power supply operable in an ordinary condition or at the time when the machine is stopped. Machining situation of a product of an object to be inspected is measured by an optoelectric observation unit 211 encircled by dotted lines. Such a measurement is carried out by irradiating a light emitted from a light emitting element 212 such as a light emitting diode toward the object to be inspected to sequentially catch a reflected light corresponding to a change in the surface condition by using a light receiving element 213 such as a phototransistor, thereby to convert the voltage change thus caught into a frequency change of 50 to 200 KHz corresponding to the observed data to modulate a carrier wave having a frequency of 4 MHz, thus to transmit the modulated wave from the movable oscillation coil 204. This transmission wave is received and demodulated by the fixed receiving coil 202. Then, the demodulated wave is drawn out by a F/V converter circuit 215 for a second time as a detection data signal Vo corresponding to the voltage signal previously observed. By monitoring this detection data signal Vo, it is possible to judge a machining situation or a defect of the object to be inspected. Further, in the case where there exist data to be transmitted having more than one channel i.e. a large number of observation points in the object to be inspected, or an inspection over a multichannel such that a large number of products are observed substantially at the same time is carried out, a necessary number of optoelectric observation units are arranged as partially illustrated in the figure to effect measurement in a predetermined order, or in an order based on an instruction of a control signal from a stationary transmitting unit separately provided, or to sequentially take out respective measured results from a switching circuit 216 to use them for judging the defect portions. In this instance, for switching each observation point or effecting positioning of each product, position detecting devices e.g. proximity switches 217 are provided at every preselected portion, respectively. Further, by providing the switching circuit shown at the preceding stage of the V/F converter circuit 214 to directly switch a signal voltage observed, the same object can be attained. In the above-mentioned embodiment, the detection mechanism adapted to the case where the optoelectric observation unit 211 and the object to be inspected of a machining product moves on the rotary moving table together has been described. It is needless to say that the same advantages can be obtained when there is employed another mechanism such that the optoelectric observation unit revolves along with the rotary moving table and the object 210 to be detected revolves on its axis at a different speed on the same table.

Then, an embodiment configured to transmit a control signal for command with respect to an optoelectric observation unit and an operating power therefor from the stationary side on the basis of the F/S (frequency shift) modulation system to handle an information signal as parallel signals in the optoelectric observation unit.

Embodiment 5

Figure 24:
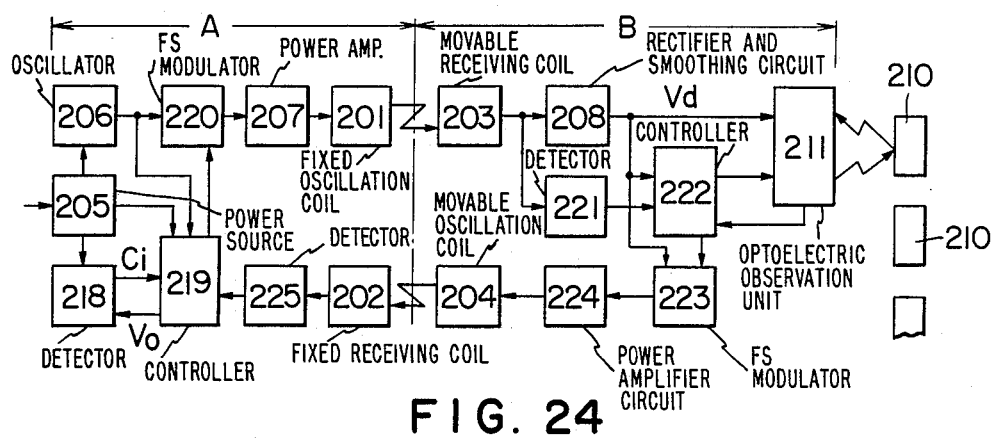

In FIG. 24, a detector unit 218 is operative to observation unit 211 and to detect a detection data signal Vo indicative of an observed result. First is to change an electromagnetic wave oscillated in the oscillator circuit 206 into a F/S modulated wave corresponding to the command signal Ci in a F/S modulating circuit 220. When the command signal Ci is dealt in a parallel signal form, it is sufficient to assemble a P/S (parallel-to-serial) converter circuit within a controller 219 provided with a computer to convert the command signal Ci into that in a serial signal form to modulate the command signal Ci thus converted. The command signal thus modulated is transmitted from the fixed oscillation coil 201 to the movable receiving coil 203 in the form of an electromagnetic wave through the power amplifier circuit 207 having a frequency multiplier for providing a high frequency useful for spatial transmission performed using an electromagnetic wave. A portion of the power corresponding to the received electromagnetic wave is changed into a dc output by the rectifier and smoothing circuit 208. The dc output thus obtained is delivered as an operating power necessary for each electronic circuit provided in the passive module A including the optoelectric observation unit 211. Another portion thereof is demodulated by a F/S detector circuit 221. The demodulated signal thus obtained undergoes a processing for reproducing the content of the command signal Ci by a controller comprising a computer, a S/P converter circuit and a P/S converter circuit etc. By inputting the signal thus reproduced to the optoelectric observation unit 211, an observation order, and other operating commands etc. are given thereto. The observed data signal obtained in the optoelectric observation unit 211 is input to a F/S modulating circuit 223 through the controller 222, thereby changing it into a modulated wave corresponding to the data. The modulated wave is delivered to a power amplifier circuit 224 for effecting multiplication and amplification of a frequency suitable for a non-contact transmission. The data signal thus obtained is transmitted from the movable oscillation coil 204 to the fixed receiving coil 202. The data signal thus received is demodulated into serial data by a F/S detector circuit 225. By directly inputting the serial data thus obtained to the detector unit 218, or converting it into parallel data according to need, thereafter to input the parallel data to the detector unit 218, the data input to the detector unit 218 undergoes a processing as a detection signal Vo therein. In this instance, by making reference to a standard signal stored in advance in a memory circuit of the detector unit 218, it is possible to judge quality of machining situation and defect of the object 210 to be inspected. Where it is required to provide a battery in the passive module B for any reason, a secondary battery operable by using the dc output of the rectifier and smoothing circuit as a charging battery is provided.

In the above-mentioned embodiment, the mechanism for effecting transmission and reception of power and signal through at least two pairs of concentric coils has been described. Instead of such a mechanism, another mechanism may be employed to provide at least two heads comprising a fixed head provided with the fixed oscillation coil 201 and the fixed receiving coil 202 integrally formed with each other and a movable head provided with the movable receiving coil 203 and the movable oscillation coil 204 integrally formed with each other to mutually effect transmission and reception of power and signal when both the heads are opposite to each other.

In addition, where there exists a multiple mechanical movement in a data transmission path as in the case where a different rotary or rocking or oscillating mechanism is associatedly provided on the above-mentioned rotary moving table, the means according to this embodiment may be secondarily applied to each division of such a movable mechanism.

It is needless to say that this is applicable to not only this embodiment, but also all embodiments according to the present invention.

Figure 25:
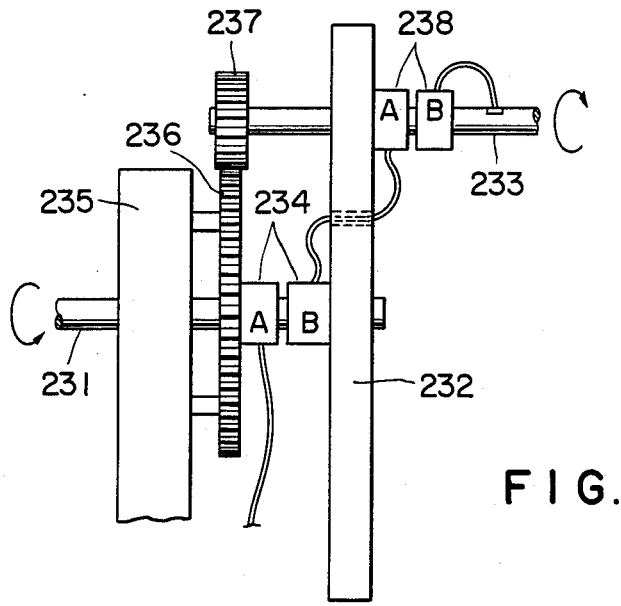
FIG. 25 is a schematic view illustrating an example of a structure to which the embodiments shown in FIGS. 23 and 24 are applied.

FIG. 25 is a schematic view illustrating an embodiment based on the above-mentioned system. This mechanism comprises a main shaft 231 driven by a rotary prime mover, and a rotary disk 232 coupled to the main shaft 231, thus to detect what degree of distortion is produced by a load applied to a subshaft 233 provided on the disk 232. In this example, the main shaft 231, the disk 232 and a passive module B of a main signal transmission device 234 rotate cooperatively. A bearing 235 of a fixed unit, a main gear 236 and an active module A of the main signal transmission device 234 are placed in a fixed condition. Further, the subshaft 233, a subgear 237 and a passive module B of an auxiliary signal transmission device 238 coaxially provided rotate cooperatively An active module A of the auxiliary signal transmission device 238 is fixed to the disk 232. Accordingly, when the main shaft 231 is driven by an external rotary prime mover, the disk 232 rotates, allowing the subgear 237 provided thereon to mesh with the main gear 236 fixed. As a result, the subgear 237 rotates, and the subshaft 233 also rotates, accordingly. On the subshaft 233, a strain gauge 239 is provided. A detection output of the strain gauge 239 is connected to the passive module B of the auxiliary signal transmission device 238, thus making it possible to measure a load condition etc. on the basis of the degree of torsion of the shaft 233. When it is supposed that the main shaft 231, the disk 232 and the passive module B of the auxiliary signal transmission device 238 revolve round the main shaft 231, it can be expressed that the subgear 237, the subshaft 233 and the passive module B of the auxiliary signal transmission device 238 revolve on the axis of the main shaft 231. Accordingly, data measured by the strain gauge 239 is input to the passive module B of the auxiliary signal transmission device 238. After the input data is transmitted to the active module B, an output of the active module A is input to the passive module B of the main signal transmission device 234, and then is transmitted to the active module A at the stationary side. Thus, the data transmitted to the active module A is output to the external.

In this embodiment, data transmission related to revolution around the axis of the main shaft 231 is carried out in regard to only one channel. Where there is a need to provide a plurality of subshafts on the disk 232 to transmit such data from the subshafts to the stationary side, it is sufficient to provide auxiliary signal transmission devices at the subshafts, respectively, to output such data to the external through the main signal transmission device 239. In this case, a multichannel signal transmission device is required for the main signal transmission device 239.

When an attention is drawn to the data transmission path, it can be said that there is employed in this embodiment signal transmission assembly comprising main and auxiliary signal transmission devices divided into two stages. When needed according to a mechanism employed, it is apparent that the number of stages can be increased.

As a further aspect of the present inveniton, when the principle of the device according to the present invention is applied to an integrated circuit card (so called a IC card), it is possible to effect, in a non-contact manner, a transmission between the IC card and an information read/write unit (which will be called a "drive unit") which has been carried out using the contact system in the art, thus dramatically improving the reliability. As understood from the foregoing description by analogy, the IC card and the drive unit for control thereof correspond to passive and active modules, respectively.

Accordingly, signal transmission mutually effected between the IC card and the drive unit is such that transmitting and receiving coils respectively provided at both the members are opposite to each other to propagate data therebetween in the forms of an electromagnetic wave or by making use of electromagnetic coupling effect in this condition to transmit the data to the opposite coil in an inductive manner, thus to execute an information processing.

In this embodiment, basically, a wave to be modulated based on a data signal having a serial form is transmitted between a pair of transmitting and receiving coils. Further, by transmitting a wave to be modulated on the time-sharing system, multiple signal transmission can be implemented. In addition, there are instances where there is employed such an arrangement to provide a plurality of coils to transmit data in a parallel fashion according to the requirement of improving a processing speed. In such a case, it is preferably that the drive unit has a configuration corresponding to such an arrangement.

Since a planar coil like a print coil or a sheet coil is used for a coil provided in the IC card, it is preferable to provide an electromagnetic head provided with a coil properly suited to such a form and efficiently operable. Further, there is preferably employed a mechanism such that both coils are located at a predetermined position and opposite to each other by inserting the IC card into the electromagnetic head portion with the most simple operation.

In this embodiment, the drive unit comprises a transmitting and receiving block operative to effect a read/write processing of information, a power transmitting block operative to transmit a power, and the like. On the other hand, the IC card having both write and read functions basically comprises a power receiving block, a transmitting and receiving block, and a data hold block. The above-mentioned drive unit is operated by making use of a lamp wire, a battery or a power generating element etc. The power transmitting block is operative to radiate a predetermined electromagnetic wave from the transmitting coil of the electromagnetic head. The transmitting and receiving block has a function to transmit a control instruction related to an address of desired data, or a discrimination code etc. to the IC card through the transmitting and receiving coil, or to obtain a response to the transmitting operation. The control block has an information control function, a data edit function and a function to communicate with other related systems.

In the IC card, an information signal such as data or a control instruction transmitted from a drive unit with an electromagnetic being as a transmission medium is caught by a receiving coil. The information signal thus received undergoes a decoding processing or a necessary processing in an information processing circuit. Next is to select a required data to transmit the information signal corresponding thereto to the drive unit. The data hold block is configured as a data storage circuit as its major circuit component. The power receiving block is operative to deliver a power received as a magnetic wave by the power receiving coil as an operating power supply voltage required for each processing circuit, and to charge a storage element such as a battery associated with a rectifier and smoothing circuit by using a portion of the power to deliver the charged voltage as operating power supply voltages required for the data hold block and other blocks.

The signal transmission device according to this embodiment is characterized in that transmission is carried out in a non-contact manner. However, a terminal or other contact portion may be additionally used.

Figure 26:
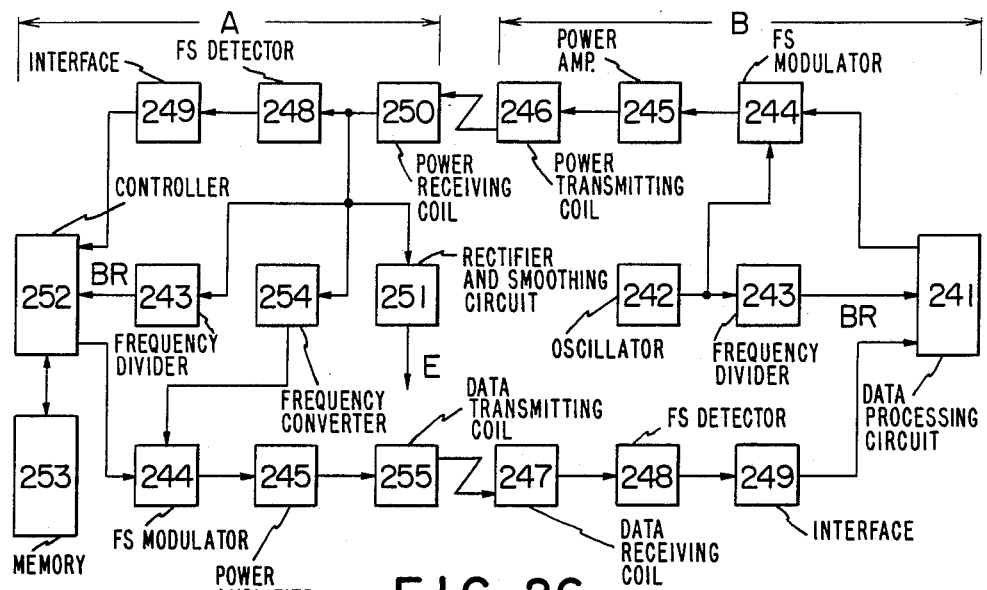
FIGS 26 and 27 are block diagrams illustrating circuit construction of embodiments for transmitting a signal to an IC card and receiving the signal therefrom.

FIG. 26 is a block diagram illustrating an embodiment based on a system of transmitting a necessary command or data with it being superimposed on a carrier wave for power transmission wherein symbols A and B represent an IC card and a drive unit, respectively.

When data is written from the drive unit B to the IC card A, first is to change serial data output from a data processing unit 241 having a function of communicating with a host computer etc., data edit function and the like into a F/S modulated wave by using a F/S (frequency shift) modulating circuit 244 driven by an oscillator circuit 242 for power transmission. This modulated wave is power-amplified by a power amplifier 245 to propagate the modulated wave amplified from a power transmitting coil 246 as an electromganetic wave. In this instance, the data output from the data processing unit 241 represent information signals related to addresses of data stored in the IC card A or write/read instructions therefor Since these data are generally handled as parallel data, it is necessary to apply parallel-to-serial conversion (which will be called a "P/S conversion" hereinafter) to these parallel data in advance, thereafter to transmit the serial data thus obtained.

The electromagnetic wave for power transmission radiated from the above-mentioned transmitting coil 246 is received by a power receiving coil 250 provided in the IC card A. A portion of the received power is changed into a dc output by a rectifier and smoothing circuit 251. The power supply voltage E thus obtained as the dc output is delivered for charging a battery assembled in association with the processing circuit in each circuit and the rectifier and smoothing circuit 251 provided in the IC card A.

Another portion of the received power is reduced in its frequency by the frequency divider 243. The power which has frequency dividing processing is changed into a power having a frequency BR common to a baud rate clock in the drive unit B. The power thus obtained is then delivered to a controller 252. Further, a data signal received along with the power is demodulated into the original serial data by a F/S detector circuit 248. Subsequently, the serial data is input to the controller 252 constituted with a microcomputer or a logic circuit etc. through an interface circuit 249. The input data undergoes serial-to-parallel conversion (which will be called a "S/P conversion" hereinafter) by a program of the controller by making reference to the baud rate clock BR, thus to execute a processing corresponding to the content of the parallel data thus obtained.

Namely, when the data is a write instruction, the subsequent data is written into a memory 253. On the other hand, when the data is a read instruction, corresponding parallel data is stored in the memory 253. On the other hand, when the data is a read instruction, corresponding parallel data stored in the memory 253 is read. The PS conversion is applied to the parallel data thus read on the basis of a predetermined program. Then, the serial data is changed into a F/S modulated wave corresponding thereto by the F/S converter circuit 244 driven by a frequency converter circuit 254 for effecting a conversion into a frequency suitable transmission by using a portion of the input of the power receiving coil 250 as a reference. The modulated wave is power-amplified by the power amplifier 45. The modulated wave thus amplified is radiated from the data transmitting coil 255 as an electromagnetic wave.

To read the electromagnetic wave radiated into the drive unit B, the electromagnetic wave is received by the data receiving coil 47. The data thus received is demodulated into serial data by the F/S detector circuit 248. The serial data thus obtained is input to the data processing unit 241 through the interface circuit 249. The data processing unit 241 performs the S/P conversion by making reference to the baud rate clock BR to execute an internal processing required for data read out of the IC card A. Where the P/S conversion or the S/P conversion is effected by using the program of the controller 252, or conversion is effected by using hardware, a reference frequency varies to some extent due to the F/S modulation. Even when a frequency of the baud rate clock varies by about 15%, it is possible to realize a handling such that synchronization is not damaged. On the other hand, since it is sufficient that a frequency shift based on the F/S modulation is a few percent, there is no possibility that the synchronization between the IC card A and the drive unit B is damaged.

Figure 27:
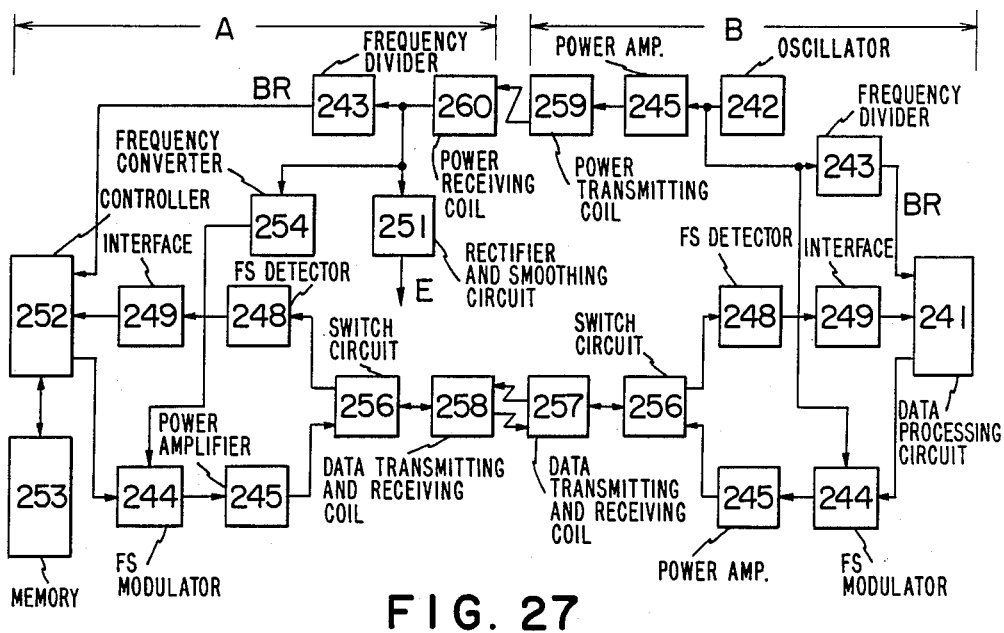

FIG. 27 is a block diagram illustrating a modified embodiment of the embodiment shown in FIG. 26 wherein the drive unit is provided with a transmitting block for power transmission separately from a transmitting and receiving block for an information signal such as data or control instruction etc. Similarly to the embodiment shown in FIG. 26, symbols A and B represent IC card and drive unit. Namely, this embodiment is characterized in that transmission and reception of data or other information signals between the IC card A and the drive unit B is carried out in the form of an electromagnetic wave by making use of data transmitting and receiving coils 257 and 258 respectively provided in the drive unit B and the IC card A. When an information signal such as an address or a control instruction is written into the IC card A from the drive unit B, the information signal of parallel data is subject to the P/S conversion in the data processing unit 241 by making use of the baud rate clock BR in the same manner as in the above-mentioned embodiment. The serial data thus obtained is changed into a F/S modulated wave by the F/S modulating circuit 244 driven by the oscillator circuit 242. This modulated wave is power-amplified by the power amplifier 245. When a transmitting and receiving switch circuit 256 is switched into an output direction in response to a control signal from the data processing unit, the modulated wave amplified by the power amplifier 245 is propagated from the data transmitting and receiving coil 257 as an electromagnetic wave. This electromagnetic wave is received by the data transmitting and receiving coil 258 of the IC card A. The electromagnetic wave thus received is input to the F/S detector circuit 248 through a transmitting and receiving switch circuit 256 switched into an input direction in response to a control signal from the controller. By the F/S detector circuit 248, the data corresponding to the electromagnetic wave is demodulated into serial data. The serial data thus obtained is input to the controller 252 through the interface circuit 249. The controller 252 effects the S/P conversion therein in accordance with the content of the program by making reference to the baud rate clock BR to create parallel data. Where this data represents a write instruction or an address related thereto, an address etc. is set to a memory 253 to write the subsequent data thereinto.

Then, the operation for reading the data of the IC card A to the drive unit B will be described.

The controller 252 which has received a readout instruction first reads the parallel data stored in the memory 253 to apply the P/S conversion to the data thus read by making reference to the baud rate clock BR. Then, the controller 252 enables the F/S modulating circuit 244 to change the above-mentioned readout data into a F/S modulated wave on the basis of a frequency obtained by converting an output of the power receiving coil 260 by using the frequency converter circuit 254. The modulated wave thus obtained is power-amplified by the power amplifier 245. The modulated wave amplified is radiated from the transmitting and receiving coil 258 through the transmit/receive switching circuit 256. Next the electromagnetic wave is received by using the data transmitting and receiving coil 257. The data as the received electromagnetic wave is delivered to the F/S detector circuit 248 through the transmitting and receiving switching circuit 256 switched in an input direction. The data thus delivered is demodulated into serial data therein. After the serial data undergoes adjustment of its voltage level etc. by the interface circuit, it is input to the data processing unit 241. The read operation is thus completed. A power supply voltage required for the operation of a processing circuit provided in each block of the IC card A is delivered from the drive unit as follows. An oscillation output of the oscillator circuit 242 is power-amplified by the power amplifier 245. The oscillation output thus amplified is radiated from the power transmitting coil 259 for power transmission. A power as the electromagnetic wave radiated is received by the power receiving coil 260 of the IC card A. The power thus received is changed into a dc output by the rectifier and smoothing circuit 251. The dc output is delivered to each circuit as a dc power supply E. Thus, the IC card itself is operable without power supply and has no need of provision of terminal.

Where there is a need that a power source required for memory back-up or other operation is assembled in the IC card A, a necessary power supply voltage can be obtained as follows. Namely, at the time when the IC card is fitted into the drive unit, by charging a secondary battery or a large capacity of capacitor etc. incorporated in association with the rectifier and smoothing circuit 251 by utilizing the dc power supply E, it is possible to use the secondary battery etc. as a power supply. In these embodiments, the frequency for power transmission is set to multiple of integer of the baud rate clock as previously described, a common baud rate clock is advantageously obtained by allowing a reducing rate of the IC card to be equal to that of the drive unit B.

Figure 28:
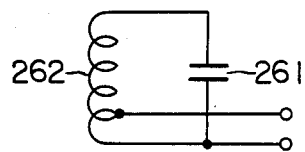
FIG. 28 is a circuit diagram illustrating an example of transmitting and receiving heads used in the embodiments shown in FIGS. 26 and 27.
Figure 30:
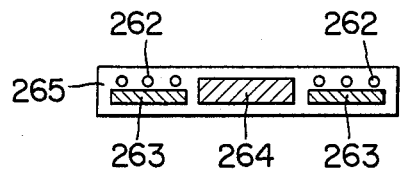
FIG. 30 is a cross sectional view illustrating an embodiment based on the application of the present invention to an IC card.

For the power transmitting coils 246 and 259, the power receiving coils 250 and 260, the data transmitting coil 255 and the data receiving coil 247, and the transmitting and receiving coils 257 and 258 employed in the above-mentioned embodiments shown in FIGS. 26 and 27, various configurations may be used. Basically, a coil 262 connected in parallel with a capacitor 261 as shown in FIG. 28 may be used. Further, such a coil 262 may be constituted with a single layer or multilayer print wiring, or a planar winding. Referring to FIG. 30, there is illustrated in a cross section the IC card employed in third embodiment wherein the IC card is provided with at least two sets of winding portions each comprising the above-mentioned coil 262 and a magnetic core 263 disposed close thereto, and a processing circuit portion 264 interposed between the two sets of winding portions wherein the winding portions and the processing circuit portion 264 are encapsulated by an insulating envelope or housing such as plastic. Accordingly, it is preferable to provide an electromagnetic head suited to such a planar coil to efficiently carry out transmission and reception of an electromagnetic wave with a pair of such planar coils being closely opposite to each other. Various systems can be adopted for the coil arrangement in the IC card. For instance, there may be used a system to symmetrically dispose a single coil or a plurality of coils on the card to provide the same transmission effect irrespective of an arrangement direction of each coil opposite to the coil portion of the drive unit. Further, another system may be used to respectively dispose coils on both the sides of the IC card to sandwich the processing circuit, or to additionally provide a shield layer for preventing magnetic or electric induction with respect to the processing circuit.

Figure 29:
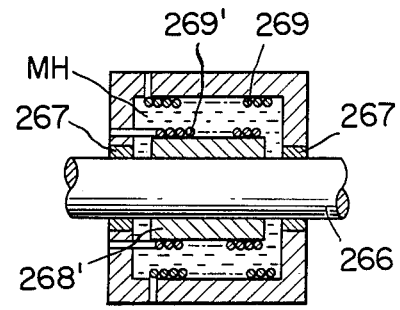
FIG. 29 is a cross sectional view illustrating an example of an electromagnetic head constituted utilizing magnetic fluid.

FIG. 29 is a schematic view illustrating an embodiment using a magnetic fluid for providing a good electromagnetic induction effect when active and passive modules employed in the present invention are applied to rotating and fixed bodies, respectively. Namely, a coil 269 is secured to a fixed core member 268 provided on a rotary shaft 266 through an oil seal 267 and a coil 269' is secured to a rotary core member 268' provided on the rotary shaft 266. A space between the fixed core member 268 and the rotary core member 268' sealed by the oil seal 267 is filled with the magnetic fluid MH.

The signal transmission having the structure thus configured can provide a good electromagnetic induction effect between both the modules.

As a further development of the above-mentioned IC card, the production of an article which can be called an "electronic file" is also possible on the basis of the same principle as that of the IC card.

This electronic file is provided with a Book comprising a plurality of sheets on file on which characters or graphical pictures etc. are described, an information file comprising an electronic circuitry for handling information corresponding to the contents of each page, and a drive unit functioning to write information into the information file and/or read it therefrom, wherein the information file and the drive unit are provided in association with the Book. More particularly, the electronic circuitry provided in the information file comprises an information hold circuit, a page decision circuit, a signal control unit, and a transmitting and receiving unit for a passive module. Further, the drive unit comprises a data processing unit an oscillation circuit, a signal control unit, a signal input unit and a transmitting and receiving unit for an active module. The electronic file thus configured makes it possible to transmit a power from the transmitting and receiving unit for the passive module to the transmitting and receiving unit for the active module in a non-contact manner, and to mutually effect transmission and reception of information, thus providing a function to express the content of the information file by using a reproducing device connected to the drive unit.

Such an information file is adapted to write data such as a description or a picture image related to the content of the file in a memory in advance, or to be capable of being written by a user. By using a reproducing device therefor, an ordinary television set or a radio receiver set, or a stereo reproducing machine etc., the storage contents of the information file can be reproduced. Accordingly, the information file according to the present invention can be utilized in the reproduction of picture images such as graphics or an animation etc. or voice related to the descriptive contents of books like ordinary book or files, or games etc. Namely, an object of this embodiment is provided an information file constituted with a file or a book comprising sheets on which characters or graphical pictures etc. are described or printed, and an electronic circuitry provided in association with the file etc. and including a very small memory unit having a large capacity, and a control circuit etc., thus rendering an active function to the files or books etc. which have been of passive nature in substance. Such an information file is roughly classified into an information file of the type having both read and write functions and an information file of the read only type. Since it is considered that the former generally include the function of the latter, the configuration of the former will be described here.

The information file has a structure comprising a book having an ordinary form obtained by binding sheets on which characters or graphical pictures are described or printed, and electronic circuitry therewith which will be described soon. Namely, the electronic circuitry is provided with an information hold circuit essentially comprising an IC memory in which information such as data or program corresponding to the content of each page, a page decision circuit for deciding a presently opened page, and a signal control unit for effecting a control of the operating and the timing of each circuit, and rectification and detection. The transmitting and receiving unit comprising a transmitting coil and a receiving coil operatively and directly controls reception of a power, and reception and transmission of an information signal transmitted from the drive unit described below in a non-contact manner with an electromagnetic wave as a transmission medium. In this instance, the received power is delivered as an operating power supply required for each circuit provided in the information file. A portion of the received power charges a battery associated with a rectifier and smoothing circuit. A voltage charged in the battery is delivered as an operating power supply voltage for data hold etc. On the other hand, the drive equipment is provided with a data processing unit functioning to edit data based on a command signal from a signal input unit, and to apply a predetermined processing to data transferred from the information file to transmit the data which has undergone the processing to a reproducing device, an oscillation circuit producing an oscillation signal having a reference signal for a power or an information signal, a signal control unit for effecting a control of the operation of each circuit and its timing and amplification or detection etc. of a predetermined modulated wave, and a transmitting and receiving unit for an active module operative to transmit an electromagnetic wave to the transmitting and receiving unit for the passive module or receive it therefrom with the transmitting and receiving unit for the active module being opposite to each coil provided in the transmitting and receiving unit for the passive module.

The input/output unit comprises a signal input unit capable of inputting an information signal such as an operation command signal, data and write/read instruction for the data by using a keyboard, and a reproducing unit for outputting an information from the data processing unit in the form of a picture image or a voice.

These drive unit and the input unit may be provided in a binding portion of a book incorporatedly with the information file. According to use purpose, they may be provided separately from the information file, or only the transmitting and receiving unit for the active module is provided in the book and the remaining portions are provided at the outside separately therefrom. In this embodiment, an electromagnetic wave is used for a medium for transmitting a power or an information signal in a non-contact manner between respective coils provided in the active and passive modules. Such an electromagnetic wave may have a frequency range from a low frequency above a commercial alternating current frequency to a radio frequency of a radio wave etc.

In this instance, there may be employed a system of transmitting an electromagnetic wave on which a power and an information signal are superimposed from the transmitting coil of the drive unit to the receiving coil of the information file, or a method of providing a transmitting coil for power transmission in the drive unit, thus to separate the transmitting coil for power from a transmitting and receiving coil for an information signal. Generally, an information signal for transmission between a pair of coils for transmission and reception and handled in a processing circuit is of a serial form. By employing various pulse modulation or frequency modulation systems on a time-sharing basis, multiplex signal transmission is possible. It is also effective that there is employed an arrangement such that a plurality of coils are provided, thereby allowing an electronic file to be operative in a parallel fashion by taking into account how to use the electronic file or the content of a processing required.

Since a coil formed as flat as possible is required for such a coil, a planar coil of a single layher or multilayer type such as a sheet coil can be preferably applied. Further, where a clock common to the drive unit and the information file is required (e.g. a baud rate clock is shared when data is serially transmitted), by modulating an electromagnetic wave for power transmission using the clock frequency, or setting a frequency for power transmission to a multiple of integer of a clock frequency to be transmitted, scaling between the information file and the drive unit is facilitated, and the information file and the drive unit can be operated using the common clock, resulting in stabilization of functions of the electronic file.

An embodiment of an electronic file according to the present invention will be described in detail particularly in connection with an electronic circuitry and other parts associated therewith with reference to the attached drawings.

Embodiment 6

Figure 31:
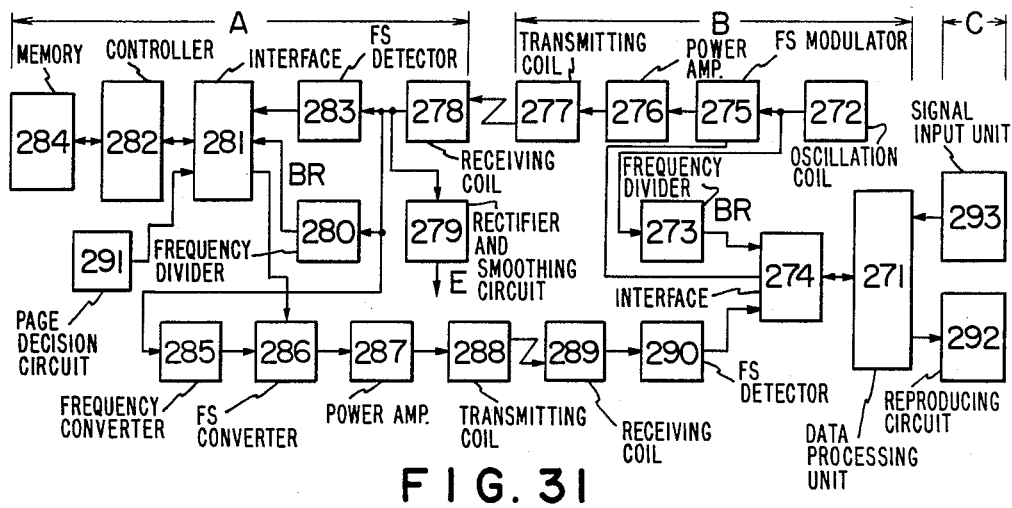
FIG. 31 is a block diagram illustrating a circuit construction of an embodiment based on the application of the present invention to an electronic file.

FIG. 31 shows an example of an electronic circuitry constituting an electronic file according to the present invention wherein the electronic file in this embodiment is adapted so that an information file corresponding to one page independently functions. As shown in this figure, the electronic file comprises an information file A, a drive unit B and an input/output unit C. The drive unit B is ordinarily operated by a commercial power supply delivered from the external or a battery. When data is written into the information file A from the drive unit B, a data processing unit 271 having a function of communicating with a host computer etc., a data edit function or the like in advance converts parallel data handle therein into serial data by making reference to a baud rate clock BR obtained by reducing a frequency of an oscillation coil 272 using a frequency divider 273. The serial data thus obtained is input to a F/S (frequency shift) modulating circuit 275 driven by the oscillation circuit 272. Thus, this serial data is changed into a F/S modulated wave. The modulated wave is power-amplified by a power amplifier 276. Then, the modulated wave amplified is propagated from a transmitting coil 277 of the transmitting and receiving unit for the active module as an electromagnetic wave.

In this instance, data transmitted from the data processing unit 271 are information signals e.g. a write instruction for the information file A, an address for its store, and data requied to be transmitted. In a manner stated above, an electromagnetic wave indicative of power and information radiated from the transmitting coil 277 is received by a receiving coil 278 of the transmitting and receiving unit for the passive module provided in the information file A. A portion of the energy of the received electromagnetic wave is changed into a dc output by the rectifier and smoothing circuit. The dc output thus obtained is delivered as a power supply voltage E for charging a battery assembled in association with each circuit within the information file A and the rectifier and smoothing circuit 279. By reducing another portion of the energy of the received electromagnetic wave in its frequency using a frequency divider 280, a clock frequency common to the baud rate clock in the drive unit B is obtained. The frequency output thus obtained is delivered to a controller 282 through an interface 281. By detecting a further portion of the energy of the electromagnetic wave received by the receiving coil 278 using a F/S detector circuit 283, it is demodulated into the original serial data. The serial data thus obtained is input to the controller 282 constituted with a microcomputer or logic circuits through the interface 281. This input data is converted into parallel data by the program stored in the controller 282 by making reference to the baud rate clock BR to write a predetermined data conforming to the write instruction.

The processing for writing data into the information file A from the drive unit B is thus executed. Where an information signal transmitted from the data processing unit 271 of the drive unit B represents a read instruction of data from the information file A, this information signal is input to the controller 282 in the same route as stated above. The controller 282 provides an access to the memory 284 to read corresponding data stored in a designated address. Then, the controller 282 converts the data thus read into the serial data for a second time. The frequency of the serial data thus obtained is converted into a frequency suitable for transmission by a frequency suitable for transmission by a frequency converter circuit 285 with an output frequency of the receiving coil 278 being as a reference. Then, the output of the frequency converter circuit 285 drives a F/S converter circuit 286 to change into a F/S modulated wave corresponding to the serial data. After the modulated wave is power-amplified by a power amplifier 287, it is radiated from the transmitting coil 288 as an electromagnetic wave.

The data of the electromagnetic wave radiated is received by a receiving coil 289 of the drive unit B. The received data is demodulated into serial data by a F/S detector circuit 290. The serial data thus obtained is input to the data processing unit 271 through the interface 274 for effecting voltage adjustment or buffering. The data processing unit 271 converts the serial data thus input into parallel data by making reference to the baud rate clock BR, thereafter to apply a necessary internal processing to the parallel data to output the data which has undergone the processing to a reproducing unit 292. The drive unit B is connected to a signal input unit 293 for giving an operational command using a particular key board or switch etc. arranged in the input/output unit C, thereby providing an on/off signal when the electronic file is used and various operational command signals for the data processing unit 271. A page decision circuit 291 recognizes a page of an opened book to output a page designation signal to the controller 282 through the interface 281. When there is a need to designate a page except for the concerned page to output its designation signal to the reproducing unit 292, a command therefor may be input from the above-mentioned signal input unit 293 by manual operation. FIG. 32 shows an example of a card provided therein with each electronic circuit of the information file A fitted on each page of a book. This card comprises the receiving and transmitting coils 278 and 288 formed planar provided within an envelope 294 of plastic material etc., and a functional module 295 provided in the vicinity of the central portion of the card, and including an information hold circuit, a page decision circuit, a signal control unit and other electronic circuits which are configured by LSI techniques.

In an actual use, capacitors are ordinarily connected in parallel on both the sides of the receiving coil 278 and the transmitting coil 288. FIG. 33 is a cross sectional view illustrating a modification of the embodiment shown in FIG. 32. In this modified embodiment, magnetic cores 279 such as ferrite having a sufficient permeability with respect to a frequency used are used in contact with each coil 296. By employing such a structure, it is possible to provide a large inductance even when the number of turns is small. An electronic circuit provided in the drive unit B is formed planar in a manner substantially similar to the above. There is employed an arrangement such that the transmitting and receiving coils 277 and 289 are closely opposite to the coils 278 and 288 of the information file A, respectively.

Accordingly, there can be employed various systems in regard of arrangement of such planar coils. By adopting an arrangement such that single or plural coils are disposed bisymmetrically on the card, or an arrangement a plurality of coils are perpendicularly or obliquely disposed, there can be employed various configuration adapted to prevent crosstalk between coils for power and information signal or to additionally a shield layer for preventing magnetic or electric induction with respect to a memory or a processing circuit. FIG. 34 is a perspective view illustrating one form of an electronic file provided with the abovementioned electronic circuits according to the present invention. On a sheet of a left page of an opened book as shown, characters or graphical pictures are printed. On the other hand, circuit for holding information corresponding to the contents thereof, the page decision circuit, the signal control unit and the transmitting and receiving unit are provided on a sheet 299 of a right page. Accordingly, each surface of individual sheets constitutes a print surface, and the back side surface thereof on which the information file A is provided.

Most of electronic circuits of the drive device B are provided on a mounting portion 300. The abovementioned transmitting and receiving coils 277 and 289 are incorporated in an inside cover 301 which can be turned over with respect to the mounting portion, and a signal input unit 302 for the operational command on which a planar input key board or switch is arranged is mounted thereon. Where it is required to open other pages, such an opening operation is carried out with the inside cover 301 being in a developed condition as shown by the dotted lines. Ordinarily, by a resilient force given by a spring etc. incorporated in a flexible back cover 303 of the inside cover 301, the inside cover 301 is pressed onto the surface of the sheet 299 as shown, with the result that the coils 277 and 278 provided in the transmitting and receiving unit for the active module are closely opposite to the coils 288 and 289 provided in the transmitting and receiving unit for the passive module, respectively. Accordingly, this electronic file requires only one set of the drive equipment B. However, since an electronic circuit of the information file A is basically mounted on each page, plural sets of electronic circuits are required in correspondence with a necessary number of pages. Thus, a book is constituted with the one set of the drive equipment B and the plural sets of electronic circuits of the information file A.

Further, the inside cover 301 is provided with the reproducing unit 292 comprised of a small and planar image reproducing device operable by a small power like a liquid crystal picture device, or an accoustic device etc. By using this reproducing unit 292, the content of data based on an output signal from the data processing unit 271 of the drive equipment B can be exhibited as image or voice.

The electronic file in this embodiment is additionally provided with a connection terminal for taking a power into the drive equipment B or a connection terminal for connecting it to various reproducing devices externally connected.

Embodiment 7

FIG. 35 illustrates another form of an electronic file according to the present invention. The electronic file in this embodiment is operative on the basis of the electronic circuitry shown in FIG. 31. The Book in this embodiment, is provided with only the information file A. By only mounting this information file A onto a pedestal 304 on which only the transmitting and receiving unit for the active module of the drive equipment B is provided, both the information file A and the drive equipment B are automatically coupled. This embodiment is characterized in that it is possible to share the pedestal 304 with respect to other Books prepared. Namely, functional modules 305 of respective electronic circuits having the function of the information file A are provided in a lump at the back cover 306, and the receiving and transmitting coils 278 and 288 are incorporatedly provided on the surface of the mounting portion 300. The transmitting and receiving coils 277 and 289 of the drive equipment B are provided on the pedestal so that they are opposite to each other. Other electronic circuits of the drive equipment B is connected to the external through the terminal T of the pedestal 304. The control of the input/output unit C for use in an input of the operational command signal an output of reproduction signal, or the like is carried out by a personal computer or other equipment. In such a case, the elementary configuration and function of the information file A and the drive equipment B are substantially the same as those of the embodiment shown in FIG. 31. Accordingly, their explanation will be omitted here, and only the configuration of the page decision circuit will be described. As shown in FIG. 35, page codes 307 in regard of bar and space arranged in conformity with BCD code are printed on end portions of respective pages by using a color having a contrast with respect to color or brilliance of the surface of the sheet 298 of each page, and adapted to a spectroscopic sensitivity characteristic of an optoelectric sensor 308. Each page code 307 is optically recognized from a slanting direction and is converted into a corresponding electric signal by each of optoelectric sensors 308 arranged in group by making use of the fact that an opened page is irradiated by natural light. Based on each output signal from the optoelectric sensors 308, a concerned page is decided. The page decision signals thus obtained are input to the controller 282 through the interface 281. Thus, the controller 282 determines an address of the memory 284 corresponding to the concerned page to execute a predetermined data processing.

In the above-mentioned embodiments, where there is a need that a battery required for memory back-up or other operation is provided in the information file A, by charging a secondary battery provided in association with the rectifier and smoothing circuit 279 automatically by using a program, or every time or according to need by making use of the dc power supply E, it is possible to place the battery at a user's service. An optoelectric element of the generator type like a solar cell operative by receiving an irradiating light from the external, or a long life primary battery may be assembled into the information file A as an auxiliary battery.

As described in detail, the signal transmission device according to the present invention can transmit, in a non-contact manner, a power required for the operation of the passive module from the active module, thus allowing the passive module to be ordinarily operative without power supply.

Accordingly, this is greatly advantageous in that any battery exchange is not required when the passive module or the active module is assembled into moving portions of various mechanisms of production machines or the like. The device according to the present invention is provided with a secondary battery or a large capacity of capacitor associated with the passive module. Accordingly, when power is not transmitted as in the case where the device is out of operation or transmitting and receiving heads are not opposite to each other, the device according to this embodiment can utilize the secondary battery or the large capacity of capacitor as an operating power supply of each portion of the passive module by carrying out switching of power supply at any time or automatically according to need. Even when used at a place where an electric noise is large, the device according to the present invention performs data transmission using light, thus making it possible to realize an accurate signal transmission.

In addition, by setting a frequency for power transmission to that of a reference clock (e.g. baud rate clock etc.) common to the passive and active modules, it is possible to simplify the circuit arrangement and to stabilize the operation.

What is claimed is:

1. A signal transmission device for controlling and providing power to a load, said device comprising an active module and a passive module, one of said modules having means for generating a repetitive electrical signal and one of said modules having means for frequency modulating the repetitive signal to provide modulated signals, said active module including means for transmitting modulated electromagnetic signals based upon the modulated signals, the modulated electromagnetic signals including light signals, and means for receiving modulated electromagnetic signals, including light signals;

a passive module physically remote from and in electromagnetic transmissive communication with said active module, said passive module having electronic circuitry including means for transmitting modulated electromagnetic signals, based upon the modulated signals, to said active module, means for receiving the modulated electromagnetic signals transmitted from said active module, and means for deriving power from the modulated electromagnetic signals received from said active module for supplying power to said electronic circuitry and an electrical load connected to said passive module.

2. A signal transmission device as set forth in claim 1, wherein each module comprises at least one pair of electromagnetic heads, each said electromagnetic head comprising a plurality of magnetic cores having different frequency characteristics and transmitting and receiving coils provided at said magnetic cores, the heads of each pair of electromagnetic heads being disposed opposite to each other.

3. A signal transmission device as set forth in claim 1, wherein said active module comprises a transmitting head and said passive module comprises a receiving head for transmitting and receiving power, said heads being separated by a magnetic fluid.

4. A signal transmission device as set forth in claim 1, wherein said transmitting means of said active module comprises a transmitting head for transmitting power and said receiving means of said passive module comprises a receiving head for receiving transmitted power, each of said heads including a planar coil.

5. A signal transmission device as set forth in claim 1, further comprising charge storage means provided with said passive module, said charge storage means adapted to be charged by power transmitted from said active module by the modulated electromagnetic signals, whereby said storage means becomes operative as a power source.

6. A signal transmission device as set forth in claim 1, wherein the modulated electromagnetic signal has a frequency providing a clock source common to said modules.

7. A signal transmission device as set forth in claim 1, wherein said modulated electromagnetic signals transmitted by said transmitting means of said passive module comprises an information signal, said active module further comprising means responsive to the information signal to automatically control transmission output of power for said passive module from said active module according to the signal intensity of the information signal to achieve optimal power transmission.

8. A signal transmission device as set forth in claim 1, wherein said passive module further comprises feedback means for providing to said active module a feedback signal indicative of a change in power output, and said active module further comprising means for automatically controlling transmission output of power in response to a received feedback signal to achieve optimal power transmission.

9. A signal transmission device as set forth in claim 1, wherein said active and passive modules include means responsive to a change in transmission parameters depending on the distance between said passive and active modules or an environmental condition for generating a signal representative of the change and transmitting the generated signal to the other of said modules, said other module including means for automatically controlling the transmission frequency in response to the signal representative of the change to place the transmission in an optimum condition.

10. A signal transmission device as set forth in claim 1, wherein said active and passive modules include means for detecting a change in a transmission parameter in a transmission therefrom and for automatically controlling the transmission frequency of said transmission to place the transmission in an optimum condition.

11. A signal transmission device as set forth in claim 1, wherein one of said modules further comprises means for generating a transmission command signal and the other of said modules includes means for sampling and accumulating data in a data storage unit, said one module transmitting the accumulated data to the other module in response to the transmission command signal.

12. A signal transmission device as set forth in claim 11, wherein said transmission command signal is transmitted on the basis of the signal intensity of a data signal transmitted from said passive module to said active module.

13. A signal transmission device as set forth in claim 1, wherein said passive module further comprises charge storage means chargeable by received power, said device further comprising a circuit for determining a charged condition of said storage means and means for causing transmission of a data signal from said passive module to said active module at a predetermined time with said charge storage means acting as a power source.

14. A signal transmission device as set forth in claim 13, wherein said transmitting means of said active and said passive modules are opposite to each other, said device further comprising a timer circuit for timing the charging of said charge storage means.

15. A signal transmission device as set forth in claim 1, wherein at least one of said modules further comprises a detector circuit for detecting whether said transmitting means of said active and passive modules are opposite to each other, and control means responsive to a detection signal from said detector circuit indictative of the relative positions of said modules for controlling the charging of said storage means.

16. A signal transmission device as set forth in claim 1, wherein each of said modules comprises information processing means.

17. A signal transmission device as claimed in claim 6, wherein the modulated electromagnetic signal is a light signal.

18. A signal transmission device as claimed in claim 1, wherein:
  said device further comprises a plurality of said passive modules, each passive module arranged on a corresponding sheet also having printed matter thereon, and means fastening the plurality of sheets together to form a book;
  said transmitting means and said receiving means of said active and passive modules comprise transmitting and receiving heads, the modulated electromagnetic signals transmitted by said transmitting heads including a power signal and an information signal;
  said electronic circuitry of each of said passive modules further comprises an information processing circuit, a memory, an information holding circuit, a page decision circuit, and a signal controller connecting said page decision circuit to said information processing circuit,
  said active module comprises driving means connected to said transmitting means and said receiving means, said driving means having said repetitive signal generating means in the form of an oscillator, signal input means, and data processing means, including information reading and writing means, connecting said signal input means to said transmitting means,
  said device further comprises reproducing means connected to said driving means for reproducing the content of said sheets.

19. A signal transmission device as set forth in claim 1, wherein said frequency modulating means comprises a frequency shift modulator.

* * * * *

UNITED STATES PATENT AND TRADEMARK OFFICE
CERTIFICATE OF CORRECTION

PATENT NO. : 4,837,556
DATED : June 6, 1989
INVENTOR(S) : MATSUSHITA, et al.

It is certified that error appears in the above-indentified patent and that said Letters Patent is hereby corrected as shown below:

On the cover sheet, the assignee field (field 73) should be as follows:

Assignee: KABUSHIKI KAISHA NIHON DENZAI
              KOGYO KENKYUSHO
                  Kawasaki, Japan; A Part Interest Signed and Sealed this Twenty-eighth Day of September, 1999

*Attest:*

Q. TODD DICKINSON

*Attesting Officer*          *Acting Commissioner of Patents and Trademarks*